(12) United States Patent
Veschambre

(10) Patent No.: US 12,485,241 B2
(45) Date of Patent: Dec. 2, 2025

(54) METHODS AND APPARATUS FOR RESPIRATORY THERAPY

(71) Applicant: ResMed Pty Ltd, Bella Vista (AU)

(72) Inventor: Etienne Veschambre, Sydney (AU)

(73) Assignee: ResMed Pty Ltd (AU)

( * ) Notice: Subject to any disclaimer, the term of this patent is extended or adjusted under 35 U.S.C. 154(b) by 964 days.

(21) Appl. No.: 17/626,918

(22) PCT Filed: Jul. 30, 2020

(86) PCT No.: PCT/AU2020/050773
§ 371 (c)(1),
(2) Date: Jan. 13, 2022

(87) PCT Pub. No.: WO2021/016662
PCT Pub. Date: Feb. 4, 2021

(65) Prior Publication Data
US 2022/0362498 A1    Nov. 17, 2022

Related U.S. Application Data

(60) Provisional application No. 62/880,533, filed on Jul. 30, 2019.

(51) Int. Cl.
*A61M 16/00* (2006.01)

(52) U.S. Cl.
CPC ...... *A61M 16/026* (2017.08); *A61M 16/0003* (2014.02); *A61M 16/0066* (2013.01);
(Continued)

(58) Field of Classification Search
CPC .... A61M 16/00–0003; A61M 16/0051; A61M 16/0057–0084;
(Continued)

(56) References Cited

U.S. PATENT DOCUMENTS

| 4,944,310 A | 7/1990 | Sullivan |
| 5,704,345 A | 1/1998 | Berthon-Jones |

(Continued)

FOREIGN PATENT DOCUMENTS

| GB | 2472592 A | 2/2011 |
| JP | 2008518646 A | 6/2008 |

(Continued)

OTHER PUBLICATIONS

First Examination Report issued in corresponding Australian Patent Application No. 2020323298, mailed Jan. 31, 2025, 3 pages.
(Continued)

*Primary Examiner* — Rachel T Sippel
(74) *Attorney, Agent, or Firm* — Botos Churchill IP Law LLP

(57) ABSTRACT

Methods and apparatus, such as a controller of a respiratory therapy device, generate a signal representing an estimate of flow rate of gas flow from the device. The respiratory therapy device may include a motor-operated blower. The method may include receiving in the controller, signals generated by a set of sensors, including measures of pressure and frequency (e.g., speed) of the motor. The controller may be configured to compute an entrained air density function and generate the estimate signal based on a function of the measures of pressure and frequency, and the entrained air density function. The entrained air density function may apply signals from additional sensors, such as atmospheric pressure, gas temperature, and ambient relative humidity, to compute atmospheric density. Control operations of the therapy device may then be based on the estimated signal, which may be applied to assess accuracy of a signal from a flow sensor.

42 Claims, 20 Drawing Sheets

(52) U.S. Cl.
CPC ............... *A61M 2016/0027* (2013.01); *A61M 2205/3358* (2013.01); *A61M 2205/3365* (2013.01); *A61M 2205/3368* (2013.01)

(58) Field of Classification Search
CPC .... A61M 16/021–026; A61M 16/1045; A61M 16/14–161; A61M 2016/0015–0042; A61M 2205/3331–3368
See application file for complete search history.

(56) References Cited

U.S. PATENT DOCUMENTS

| | | | |
|---|---|---|---|
| 6,237,593 | B1 | 5/2001 | Brydon |
| 6,532,959 | B1 | 3/2003 | Berthon-Jones |
| 7,866,944 | B2 | 1/2011 | Barton et al. |
| 8,636,479 | B2 | 1/2014 | Barton et al. |
| 8,638,014 | B2 | 1/2014 | David |
| 9,119,979 | B2 | 9/2015 | Curran et al. |
| 10,350,379 | B2 | 7/2019 | Sweeney et al. |
| 2006/0107953 | A1 | 5/2006 | Truschel et al. |
| 2006/0283450 | A1 | 12/2006 | Shissler |
| 2008/0251076 | A1* | 10/2008 | Goeldi ............... A61M 16/0066 128/204.18 |
| 2010/0319697 | A1* | 12/2010 | Farrugia ............. F04D 25/0666 128/204.18 |
| 2011/0023874 | A1 | 2/2011 | Bath et al. |
| 2012/0138051 | A1 | 6/2012 | Curran et al. |
| 2015/0020807 | A1 | 1/2015 | Kimmel |
| 2015/0165140 | A1 | 6/2015 | Cappelli et al. |
| 2018/0236191 | A1 | 8/2018 | Martin et al. |
| 2019/0022433 | A1* | 1/2019 | Jancarik ............... A62B 18/006 |

FOREIGN PATENT DOCUMENTS

| | | |
|---|---|---|
| JP | 2008546476 A | 12/2008 |
| JP | 2010025042 A | 2/2010 |
| JP | 2013501585 A | 1/2013 |
| JP | 2015508694 A | 3/2015 |
| JP | 2015521502 A | 7/2015 |
| JP | 2018522687 A | 8/2018 |
| WO | 2006000017 A1 | 1/2006 |
| WO | 2006047826 A1 | 5/2006 |
| WO | 2013020167 A1 | 2/2013 |
| WO | 2013128365 A1 | 9/2013 |
| WO | 2013173219 A1 | 11/2013 |
| WO | 2014000039 A1 | 1/2014 |
| WO | 2017004642 A1 | 1/2017 |
| WO | 2017027906 A1 | 2/2017 |

OTHER PUBLICATIONS

Office Action issued in corresponding Japanese Patent Application No. 2022-506542, mailed Jan. 5, 2024, 10 pages.
Extended European Search Report issued in corresponding European Patent Application No. 20846862.9,, mailed Aug. 1, 2023, 8 pages.
Office Action issued in corresponding Chinese Patent Application No. 2020800687296, mailed Apr. 27, 2025, 21 pages.
PCT Notification of the International Search Report and the Written Opinion issued in PCT application No. PCT/AU2020/050773 on Nov. 4, 2020.
West, John B, et al., "Respiratory Physiology", Lippincott Williams & Wilkins, 9th edition, 2011.

* cited by examiner

METHODS AND APPARATUS FOR RESPIRATORY THERAPY

1 CROSS-REFERENCE TO RELATED APPLICATIONS

The present application is a national phase entry under 35 U.S.C. § 371 of International Application No. PCT/AU2020/050773, filed Jul. 30, 2020, published in English, which claims priority from U.S. Provisional Application No. 62/880,533, filed Jul. 30, 2019, all of which are incorporated herein by reference.

2 BACKGROUND OF THE TECHNOLOGY

2.1 Field of the Technology

The present technology relates to one or more of the screening, diagnosis, monitoring, treatment, prevention and amelioration of respiratory-related disorders. The present technology also relates to medical devices or apparatus, and their use, such as methods and devices useful for estimating flow, such as for evaluating accuracy of a flow sensor, detecting system or respiratory conditions, and/or controlling operations. Such processes may be implemented in the absence of a flow sensor or a properly operating flow sensor.

2.2 Description of the Related Art

2.2.1 Human Respiratory System and its Disorders

The respiratory system of the body facilitates gas exchange. The nose and mouth form the entrance to the airways of a patient.

The airways include a series of branching tubes, which become narrower, shorter and more numerous as they penetrate deeper into the lung. The prime function of the lung is gas exchange, allowing oxygen to move from the air into the venous blood and carbon dioxide to move out. The trachea divides into right and left main bronchi, which further divide eventually into terminal bronchioles. The bronchi make up the conducting airways, and do not take part in gas exchange. Further divisions of the airways lead to the respiratory bronchioles, and eventually to the alveoli. The alveolated region of the lung is where the gas exchange takes place, and is referred to as the respiratory zone. See "*Respiratory Physiology*", by John B. West, Lippincott Williams & Wilkins, 9th edition published 2011.

A range of respiratory disorders exist. Certain disorders may be characterised by particular events, e.g. apneas, hypopneas, and hyperpneas.

Obstructive Sleep Apnea (OSA), a form of Sleep Disordered Breathing (SDB), is characterized by events including occlusion or obstruction of the upper air passage during sleep. It results from a combination of an abnormally small upper airway and the normal loss of muscle tone in the region of the tongue, soft palate and posterior oropharyngeal wall during sleep. The condition causes the affected patient to stop breathing for periods typically of 30 to 120 seconds in duration, sometimes 200 to 300 times per night. It often causes excessive daytime somnolence, and it may cause cardiovascular disease and brain damage. The syndrome is a common disorder, particularly in middle aged overweight males, although a person affected may have no awareness of the problem. See U.S. Pat. No. 4,944,310 (Sullivan).

Cheyne-Stokes Respiration (CSR) is another form of sleep disordered breathing. CSR is a disorder of a patient's respiratory controller in which there are rhythmic alternating periods of waxing and waning ventilation known as CSR cycles. CSR is characterised by repetitive de-oxygenation and re-oxygenation of the arterial blood. It is possible that CSR is harmful because of the repetitive hypoxia. In some patients CSR is associated with repetitive arousal from sleep, which causes severe sleep disruption, increased sympathetic activity, and increased afterload. See U.S. Pat. No. 6,532,959 (Berthon-Jones).

Respiratory Failure is an umbrella term for respiratory disorders in which patients are unable to ventilate enough to balance the $CO_2$ in their blood if their metabolic activity rises much above rest. Respiratory failure encompasses all of the following conditions.

Obesity Hyperventilation Syndrome (OHS) is defined as the combination of severe obesity and awake chronic hypercapnia, in the absence of other known causes for hypoventilation. Symptoms include dyspnea, morning headache and excessive daytime sleepiness.

Chronic Obstructive Pulmonary Disease (COPD) encompasses any of a group of lower airway diseases that have certain characteristics in common. These include increased resistance to air movement, extended expiratory phase of respiration, and loss of the normal elasticity of the lung. Examples of COPD are emphysema and chronic bronchitis. COPD is caused by chronic tobacco smoking (primary risk factor), occupational exposures, air pollution and genetic factors. Symptoms include: dyspnea on exertion, chronic cough and sputum production.

Neuromuscular Disease (NMD) is a broad term that encompasses many diseases and ailments that impair the functioning of the muscles either directly via intrinsic muscle pathology, or indirectly via nerve pathology. Some NMD patients are characterised by progressive muscular impairment leading to loss of ambulation, being wheelchair-bound, swallowing difficulties, respiratory muscle weakness and, eventually, death from respiratory failure. Neuromuscular disorders can be divided into rapidly progressive and slowly progressive: (i) Rapidly progressive disorders: Characterised by muscle impairment that worsens over months and results in death within a few years (e.g. Amyotrophic lateral sclerosis (ALS) and Duchenne muscular dystrophy (DMD) in teenagers); (ii) Variable or slowly progressive disorders: Characterised by muscle impairment that worsens over years and only mildly reduces life expectancy (e.g. Limb girdle, Facioscapulohumeral and Myotonic muscular dystrophy). Symptoms of respiratory failure in NMD include: increasing generalised weakness, dysphagia, dyspnea on exertion and at rest, fatigue, sleepiness, morning headache, and difficulties with concentration and mood changes.

Chest wall disorders are a group of thoracic deformities that result in inefficient coupling between the respiratory muscles and the thoracic cage. The disorders are usually characterised by a restrictive defect and share the potential of long term hypercapnic respiratory failure. Scoliosis and/or kyphoscoliosis may cause severe respiratory failure. Symptoms of respiratory failure include: dyspnea on exertion, peripheral oedema, orthopnea, repeated chest infections, morning headaches, fatigue, poor sleep quality and loss of appetite.

A range of therapies have been used to treat or ameliorate such conditions. Furthermore, otherwise healthy individuals may take advantage of such therapies to prevent respiratory disorders from arising. However, these have a number of shortcomings.

2.2.2 Therapies

Continuous Positive Airway Pressure (CPAP) therapy has been used to treat Obstructive Sleep Apnea (OSA). The mechanism of action is that continuous positive airway pressure acts as a pneumatic splint and may prevent upper airway occlusion, such as by pushing the soft palate and tongue forward and away from the posterior oropharyngeal wall. Treatment of OSA by CPAP therapy may be voluntary, and hence patients may elect not to comply with therapy if they find devices used to provide such therapy one or more of: uncomfortable, difficult to use, expensive and aesthetically unappealing.

Non-invasive ventilation (NIV) provides ventilatory support to a patient through the upper airways to assist the patient breathing and/or maintain adequate oxygen levels in the body by doing some or all of the work of breathing. The ventilatory support is provided via a non-invasive patient interface. NIV has been used to treat CSR and respiratory failure, in forms such as OHS, COPD, NMD, and Chest Wall disorders. In some forms, the comfort and effectiveness of these therapies may be improved.

Patients receiving non-invasive ventilation, particularly when asleep and/or under sedation, are often subject to upper airway instability and collapse, as in OSA. Such instability and collapse can compromise the effectiveness of the ventilation therapy by reducing or even nullifying the pressure actually reaching the lungs from the ventilator.

The upper airway can be stabilised by maintaining a positive base pressure, referred to herein as the EPAP, upon which ventilatory assistance is superimposed. An insufficient EPAP permits upper airway collapse, while an excessive EPAP may fully stabilise the upper airway but negatively impact on comfort, promote mask leak, or pose cardiovascular complications. The task of choosing an EPAP that is sufficient to generally maintain upper airway stability across the range of sleep states, posture, level of sedation, and progression of disease while avoiding negative side-effects (a task known as EPAP titration) is a significant challenge even for experienced clinicians with the benefit of a full polysomnographic (PSG) study. An appropriately titrated EPAP is a balance between extremes, not necessarily one that prevents all obstructive events. While NIV enjoys growing usage globally, only a fraction of patients are administered NIV with the benefit of a PSG study to titrate the EPAP. In more acute environments, historically there is limited awareness of the effects of sleep and sedation on the efficacy of non-invasive ventilation.

There is therefore a significant need for NIV therapies capable of automatically adjusting the EPAP (i.e. performing "EPAP auto-titration") in dynamic response to the changing condition of an NIV patient's upper airway.

2.2.3 Treatment Systems

These therapies may be provided by a treatment system or device. Such systems and devices may also be used to diagnose a condition without treating it.

A treatment system may comprise a Respiratory Therapy Device (RPT device), an air circuit, a humidifier, a patient interface, and data management.

2.2.3.1 Patient Interface

A patient interface may be used to interface respiratory equipment to its wearer, for example by providing a flow of air to an entrance to the airways. The flow of air may be provided via a mask to the nose and/or mouth, a tube to the mouth or a tracheostomy tube to the trachea of a patient. Depending upon the therapy to be applied, the patient interface may form a seal, e.g., with a region of the patient's face, to facilitate the delivery of gas at a pressure at sufficient variance with ambient pressure to effect therapy, e.g., at a positive pressure of about 10 cmH$_2$O relative to ambient pressure. For other forms of therapy, such as the delivery of oxygen, the patient interface may not include a seal sufficient to facilitate delivery to the airways of a supply of gas at a positive pressure of about 10 cmH$_2$O.

2.2.3.2 Respiratory Therapy (RPT) Device

Air pressure generators are known in a range of applications, e.g. industrial-scale ventilation systems. However, air pressure generators for medical applications have particular requirements not fulfilled by more generalised air pressure generators, such as the reliability, size and weight requirements of medical devices. In addition, even devices designed for medical treatment may suffer from shortcomings, pertaining to one or more of: comfort, noise, ease of use, efficacy, size, weight, manufacturability, cost, and reliability.

One known RPT device used for treating sleep disordered breathing is the S9 Sleep Therapy System, manufactured by ResMed Limited. Another example of an RPT device is a ventilator. Ventilators such as the ResMed Stellar™ Series of Adult and Paediatric Ventilators may provide support for invasive and non-invasive non-dependent ventilation for a range of patients for treating a number of conditions such as but not limited to NMD, OHS and COPD.

The ResMed Elisée™ 150 ventilator and ResMed VS III™ ventilator may provide support for invasive and non-invasive dependent ventilation suitable for adult or paediatric patients for treating a number of conditions. These ventilators provide volumetric and barometric ventilation modes with a single or double limb circuit. RPT devices typically comprise a pressure generator, such as a motor-driven or motor-operated blower or a compressed gas reservoir, and are configured to supply a flow of air to the airway of a patient. In some cases, the flow of air may be supplied to the airway of the patient at positive pressure such as with a pressure control loop of a controller according to a pressure set point or a flow rate control loop of a controller according to a flow rate set point. The outlet of the RPT device is connected via an air circuit to a patient interface such as those described above.

RPT devices may include for example, a high flow therapy device configured to provide a high flow therapy. In this regard, some respiratory therapies may aim to deliver a prescribed respiratory volume, by delivering an inspiratory flow rate profile over a targeted duration, possibly superimposed on a positive baseline pressure. In other cases, the interface to the patient's airways is 'open' (unsealed) and the respiratory therapy may only supplement the patient's own spontaneous breathing with a flow of conditioned or enriched gas. In one example, High Flow therapy (HFT) is the provision of a continuous, heated, humidified flow of air to an entrance to the airway through an unsealed or open patient interface at a "treatment flow rate" that is held approximately constant throughout the respiratory cycle. The treatment flow rate is nominally set to exceed the patient's peak inspiratory flow rate. HFT has been used to treat OSA, CSR, respiratory failure, COPD, and other respiratory disorders. One mechanism of action is that the high flow rate of air at the airway entrance improves ventilation efficiency by flushing, or washing out, expired $CO_2$ from the patient's anatomical deadspace. Hence, HFT is thus sometimes referred to as a deadspace therapy (DST). Other benefits may include the elevated warmth and humidification (possibly of benefit in secretion management) and the potential for modest elevation of airway pressures. As an alternative to constant flow rate, the treatment flow rate may follow a profile that varies over the respiratory cycle.

2.2.3.3 Humidifier

Delivery of a flow of air without humidification may cause drying of airways. The use of a humidifier with an RPT device and the patient interface produces humidified gas that minimizes drying of the nasal mucosa and increases patient airway comfort. In addition in cooler climates, warm air applied generally to the face area in and about the patient interface is more comfortable than cold air. A range of artificial humidification devices and systems are known, however they may not fulfil the specialised requirements of a medical humidifier.

2.2.4 Monitoring Systems

Screening and diagnosis generally describe the identification of a disorder from its signs and symptoms. Screening typically gives a true/false result indicating whether or not a patient's disorder is severe enough to warrant further investigation, while diagnosis may result in clinically actionable information. Screening and diagnosis tend to be one-off processes, whereas monitoring the progress of a disorder can continue indefinitely. Some screening/diagnosis systems are suitable only for screening/diagnosis, whereas some may also be used for monitoring.

Polysomnography (PSG) is a conventional system for diagnosis/monitoring of cardio-pulmonary disorders, and typically involves expert clinical staff to apply the system. PSG typically involves the placement of 15 to 20 contact sensors on a person in order to record various biosignals such as electroencephalography (EEG), electrocardiography (ECG), electrooculograpy (EOG), electromyography (EMG), etc. PSG for sleep disordered breathing has involved two nights of observation of a patient in a clinic, one night of pure diagnosis and a second night of titration of treatment parameters by a clinician. Clinical experts may be able to diagnose or monitor patients adequately based on visual observation of PSG signals. However, there are circumstances where a clinical expert may not be available, or a clinical expert may not be affordable. PSG is therefore expensive and inconvenient. In particular it is unsuitable for in-home diagnosis/monitoring.

A more convenient screening/diagnosis/monitoring system for home use comprises a nasal cannula, a pressure sensor, a processing device, and recording means. A nasal cannula is a device comprising two hollow open-ended projections that are configured to be inserted non-invasively a little way into a patient's nares so as to interfere as little as possible with the patient's respiration. The hollow projections are in fluid communication with a pressure transducer via a Y-shaped tube. The pressure transducer provides a data signal representative of the pressure at the entrance to the patient's nares (the nasal pressure). It has been shown that a nasal pressure signal is a satisfactory proxy for the nasal flow rate signal generated by a flow rate transducer in-line with a sealed nasal mask, in that the nasal pressure signal is comparable in shape to the nasal flow rate signal. The processing device may be configured to analyse the nasal pressure signal from the pressure transducer in real time or near real time to detect and classify SDB events in order to monitor the patient's condition. Screening or diagnosis may require similar analysis but not necessarily in real time or near real time. The recording means is therefore configured to record the nasal pressure signal from the pressure transducer for later off-line or "batch" analysis by the processing device for screening/diagnosis purposes.

Additionally, in monitoring respiratory conditions during a respiratory therapy such as in determining whether to provide changes to a controlled therapy and/or detecting conditions, it can be helpful to have a measure of patient respiratory flow, which may be derived from a total flow signal provided by a flow sensor of a generator of an RPT. For example, a measure of patient respiratory flow may be utilized to detect when a patient transitions from inspiration to expiration, or expiration to inspiration, for determining when to deliver expiratory therapy settings or inspiratory therapy settings. Similarly, a measured patient respiratory flow signal may be utilized to detect patient flow limitation, apnea, hypopnea, and/or other respiratory related or sleep disordered breathing related conditions/events. These detected events provide an evaluation of a patient's condition and may be applied in an automated control system such as for making therapy adjustments such as a change to a pressure control parameter (e.g., pressure set point) or flow control parameter (e.g., a flow set point) involved in the control of a respiratory therapy device. Examples, of such adjustments are illustrated in the patent in U.S. Pat. Nos. 5,704,345 and 10,350,379. For these purposes, a measured flow signal may be derived from a flow sensor such as a differential pressure transducer or pnuemotachograph.

It may be desirable to develop further methods and devices for estimating a flow signal to improve existing methods and devices and/or to develop new therapy and detection methods and devices. For example, to ensure accurate performance by a respiratory apparatus, it may be desirable to develop methods for monitoring or detecting the accuracy of sensors, before and/or during use, such as a flow sensor, for detecting a fault with such sensors and/or for detecting system or respiratory conditions, such as in the absence of a flow sensor or the absence of properly operating flow sensor.

3 BRIEF SUMMARY OF THE TECHNOLOGY

The present technology is directed towards providing medical devices that may be used in the screening, diagnosis, monitoring of and/or treating respiratory disorders having one or more of improved comfort, cost, efficacy, ease of use and manufacturability.

Some versions of the present technology may include determining an estimate of flow rate of a breathable gas associated with a flow generator.

Some versions of the present technology may include a method of a controller for generating a signal representing an estimate of a flow rate of a flow of breathable gas associated with a respiratory therapy device. The respiratory therapy device may include a motor-operated blower. The method may include receiving in the controller, from a pressure sensor, an electronic signal representing a measure of pressure of the breathable gas. The method may include receiving in the controller, from a speed sensor, an electronic signal representing a measure of speed of the motor. The method may include computing, in the controller, an entrained air density function. The method may include generating, in the controller, the signal representing the estimate of the flow rate of the breathable gas with a flow estimate function. The flow estimate function may include a function of (1) the signal representing the measure of pressure, (b) the signal representing the measure of speed of the motor, and (c) the entrained air density function.

In some versions, the entrained air density function may include an atmospheric density value and an atmospheric density reference value. The entrained air density function may include a first ratio of the atmospheric density value and the atmospheric density reference value. The entrained air density function may include a second ratio of the atmospheric density value and the atmospheric density reference value. The method may include determining the estimate of the flow rate of breathable gas further may include computing a motor power, wherein the determined estimate of the flow rate of breathable gas may be based on the motor power. The entrained air density function may include a function of an atmospheric pressure value, a temperature value and a relative humidity value.

In some versions, the method may further include evaluating a signal from an oxygen sensor for computing the entrained air density function. The method may include receiving, in the controller, from an atmospheric pressure sensor, an electronic signal representing a measure of atmospheric pressure of the breathable gas, wherein the atmospheric pressure value may be the measure of atmospheric pressure of the breathable gas. The method may includereceiving in the controller, from a gas temperature sensor, an electronic signal representing a measure of gas temperature of the breathable gas, wherein the gas temperature value may be the measure of gas temperature of the breathable gas, The method may include receiving in the controller, from an ambient relative humidity sensor, an electronic signal representing a measure of ambient relative humidity of the breathable gas, wherein the ambient relative humidity value may be the measure of ambient relative humidity of the breathable gas.

In some versions, the function of the atmospheric pressure value, the temperature value and the relative humidity value may include a saturated vapour pressure function according to temperature. The saturated vapour pressure function according to temperature may be defined by:

$$6.1078 * e^{17.2693882 * \left(\frac{Temp_{local_{DegC}}}{Temp_{local_{DegC}} + 237.4}\right)}$$

wherein $Temp_{local\_DegC}$ may be the temperature value. The function of the atmospheric pressure value, the temperature value and the relative humidity value may include a vapour pressure function according to temperature and relative humidity. The vapour pressure function according to temperature and relative humidity may be defined by multiplying (a) a result of the saturated vapour pressure function according to temperature, and (b) the relative humidity value as follows:

$$RH_{local} * Psv(Temp_{local\_DegC})$$

wherein $RH_{local}$ may be the relative humidity value, and wherein $Psv(Temp_{local\_DegC})$ may be the saturated vapour pressure function according to temperature.

In some versions, the function of the atmospheric pressure value, the temperature value and the relative humidity value may be defined by $$\rho_0 * \left(\frac{Patm_{local} - 0.3783 * Pv(Temp_{local\_DegC}, RH_{local})}{P_0}\right) * \frac{T_0}{Temp_{\cdot local\_DegK}}$$

wherein $P_0$=103 hectoPascals; $T_0$=15 degrees Celsius or 288.15 degrees Kelvin;

$$\rho_0 = 1.2256 \ \frac{kg}{m^3};$$

$P_{atm\_local}$ may be the atmospheric pressure value; $Pv(Temp_{local\_DegC}, RH_{local})$ may be the vapour pressure function according to temperature and relative humidity; and $Temp_{local\_DegK}$ may be the temperature value.

In some versions, the flow estimate function may include a set of frequency functions. The set of frequency functions may include a first rotational frequency function, the first rotational frequency function being a function of the measure of speed of the motor and the entrained air density function. The set of frequency functions may include a second rotational frequency function, the second rotational frequency function being a function of the measure of speed of the motor. The set of frequency functions may include a third rotational frequency function, the third rotational frequency function being a function of the measure of speed of the motor and the entrained air density function. The first rotational frequency function may be defined by:

$$(C1 * RPM - C2) * \frac{\rho_{ref}}{\rho_{local}}$$

wherein RPM may be the measure of speed of the motor;

$$\frac{\rho_{ref}}{\rho_{local}}$$

may be the entrained air density function; and C1 and C2 are empirically derived constants. The second rotational frequency function may be defined by:

$$-C3 * RPM^2 - C4 * RPM - C5$$

wherein RPM may be the measure of speed of the motor; and C3, C4 and C5 are empirically derived constants. In some versions, the third rotational frequency function may be defined by:

$$(C6 * RPM^2 - C7 * RPM + C8) * \frac{\rho_{local}}{\rho_{ref}}$$

wherein RPM may be the measure of speed of the motor;

$$\frac{\rho_{ref}}{\rho_{local}}$$

may be the entrained air density function; and C6, C7 and C8 are empirically derived constants. The flow estimate function may be defined by:

$$\frac{-B - \sqrt{B^2 - 4A(C - \text{Pres\_meas})}}{2A}$$

where A may be the first rotational frequency function; B may be the second rotational frequency function; C may be the third rotational frequency function; and Pres_meas may be the measure of pressure of the breathable gas from the pressure sensor.

In some versions, the method may include receiving in the controller, from a flow rate sensor, an electronic signal representing a measure of flow rate of the breathable gas. The method may include comparing, in the controller, the electronic signal representing the measure of flow rate of the breathable gas and the generated signal representing the estimate of the flow rate of the breathable gas. The method may include generating, by the controller, an output indicator representing an assessment of accuracy of the flow rate sensor based on the comparing. The method may include, by the controller, modifying a control parameter for operating the motor-operated blower based on the output indicator. The method may include, by the controller, modifying a control parameter for operating the motor-operated blower based on the generated signal representing the estimate of the flow rate of the breathable gas. The control parameter may be any one of a pressure set point and a flow rate set point.

Some versions of the present technology may include a processor-readable medium, having stored thereon processor-executable instructions which, when executed by a processor of a controller of motor-operated blower in a respiratory therapy device, cause the processor to generate an estimate of a flow rate of a breathable gas associated with the respiratory therapy device. The processor-executable instructions may include instructions to control operations according to any of the methods described herein.

Some version of the present technology may include a respiratory therapy device. The respiratory therapy device may include a motor-operated blower adapted to couple with a patient respiratory interface and adapted to produce a respiratory therapy may include a flow of breathable gas via the patient respiratory interface. The respiratory therapy device may include a pressure sensor configured to generate an electronic signal representing a measure of pressure of the breathable gas. The respiratory therapy device may include a speed sensor configured to generate an electronic signal representing a measure of speed of the motor. The respiratory therapy device may include a controller may include one or more processors and coupled with the motor-operated blower, the pressure sensor and the speed sensor. The controller may be configured to receive the electronic signal representing a measure of pressure of the breathable gas. The controller may be configured to receive the electronic signal representing a measure of speed of the motor. The controller may be configured to compute an entrained air density function. The controller may be configured to generate a signal representing an estimate of a flow rate of the breathable gas with a flow estimate function, the flow estimate function may include a function of (1) the signal representing the measure of pressure, (b) the signal representing the measure of speed of the motor, and (c) the entrained air density function.

In some versions, the entrained air density function may include an atmospheric density value and an atmospheric density reference value. The entrained air density function may include a first ratio of the atmospheric density value and the atmospheric density reference value. The entrained air density function may include a second ratio of the atmospheric density value and the atmospheric density reference value. In some versions of the respiratory therapy device, to determine the estimate of the flow rate of breathable gas, the controller may be further configured to compute a motor power from one or more sensor signals, wherein the determined estimate of the flow rate of breathable gas may be based on the motor power. The entrained air density function may include a function of an atmospheric pressure value, a temperature value and a relative humidity value. The controller may be further configured to evaluate a signal from an oxygen sensor for computing the entrained air density function.

In some versions, the respiratory therapy device may include an atmospheric pressure sensor configured to generate an electronic signal representing a measure of atmospheric pressure of the breathable gas, wherein the atmospheric pressure value may be the measure of atmospheric pressure of the breathable gas. The respiratory therapy device may include a gas temperature sensor configured to generate an electronic signal representing a measure of gas temperature of the breathable gas, wherein the gas temperature value may be the measure of gas temperature of the breathable gas. The respiratory therapy device may include an ambient relative humidity sensor, an electronic signal representing a measure of ambient relative humidity of the breathable gas, wherein the ambient relative humidity value may be the measure of ambient relative humidity of the breathable gas. The controller may be configured to receive the electronic signal representing the measure of atmospheric pressure. The controller may be configured to receive the electronic signal representing the measure of gas temperature. The controller may be configured to receive the electronic signal representing the measure of ambient relative humidity.

In some versions, the function of the atmospheric pressure value, the temperature value and the relative humidity value may include a saturated vapour pressure function according to temperature. The saturated vapour pressure function according to temperature may be defined as described herein. The function of the atmospheric pressure value, the temperature value and the relative humidity value may include a vapour pressure function according to temperature and relative humidity. The vapour pressure function according to temperature and relative humidity may be defined by multiplying (a) a result of the saturated vapour pressure function according to temperature, and (b) the relative humidity value such as described herein. The function of the atmospheric pressure value, the temperature value and the relative humidity value may be defined as described herein.

In some versions, the flow estimate function of the respiratory therapy device may include may include a set of frequency functions. The set of frequency functions may include a first rotational frequency function, the first rotational frequency function being a function of the measure of speed of the motor and the entrained air density function. The set of frequency functions may include a second rotational frequency function, the second rotational frequency function being a function of the measure of speed of the motor. The set of frequency functions may include a third rotational frequency function, the third rotational frequency function being a function of the measure of speed of the motor and the entrained air density function. The first rotational frequency function may be defined as described herein. The second rotational frequency function may be defined as described herein. The third rotational frequency function may be defined as described herein. The flow estimate function may be defined by:

$$\frac{-B - \sqrt{B^2 - 4A(C - \text{Pres\_meas})}}{2A}$$

where A may be the first rotational frequency function; B may be the second rotational frequency function; C may be the third rotational frequency function; and Pres_meas may be the measure of pressure of the breathable gas from the pressure sensor.

In some versions, the respiratory therapy device may further include a flow rate sensor configured to generate an electronic signal representing a measure of flow rate of the breathable gas. The controller may be further configured to receive the electronic signal representing the measure of flow rate of the breathable gas. The controller may be further configured to compare the electronic signal representing the measure of flow rate of the breathable gas and the generated signal representing the estimate of the flow rate of the breathable gas. The controller may be further configured to generate an output indicator representing an assessment of accuracy of the flow rate sensor based on the comparing. The controller may be further configured to modify a control parameter for operating the motor-operated blower based on the output indicator. The controller may be further configured to modify a control parameter for operating the motor-operated blower based on the generated signal representing the estimate of the flow rate of the breathable gas. The control parameter may be any one of a pressure set point and a flow rate set point.

Some versions of the present technology may include a respiratory therapy device as described herein and may further include a processor-readable medium, having stored thereon processor-executable instructions which, when executed by the one or more processors of the controller of the motor-operated blower, cause the one or more processors to generate the estimate of a flow rate of the breathable gas, wherein the processor-executable instructions comprise instructions to control operations according to any of the methods described herein.

The methods, systems, devices and apparatus described herein can provide improved functioning in a processor, such as of a processor of a specific purpose computer, respiratory monitor and/or a controller such as a controller of a respiratory therapy apparatus. Moreover, the described methods, systems, devices and apparatus can provide improvements in the technological field of automated management, monitoring and/or treatment of respiratory conditions, including, for example, sleep disordered breathing. In this regard, the technological methods described herein can help to address problems associated with improving reliability in the automated determination of respiratory flow and/or flow rate of a gas of a respiratory device.

Of course, portions of the aspects may form sub-aspects of the present technology. Also, various ones of the sub-aspects and/or aspects may be combined in various manners and also constitute additional aspects or sub-aspects of the present technology.

Other features of the technology will be apparent from consideration of the information contained in the following detailed description, abstract, drawings and claims.

4 BRIEF DESCRIPTION OF THE DRAWINGS

The present technology is illustrated by way of example, and not by way of limitation, in the figures of the accompanying drawings, in which like reference numerals refer to similar elements including:

4.1 TREATMENT SYSTEMS

FIG. 1 shows a system including a patient 1000 wearing a patient interface 3000, in the form of a full-face mask, receiving a supply of air at positive pressure from an RPT device 4000. Air from the RPT device may be humidified in a humidifier 5000, and passes along an air circuit 4170 to the patient 1000.

4.2 RESPIRATORY SYSTEM AND FACIAL ANATOMY

FIG. 2 shows an overview of a human respiratory system including the nasal and oral cavities, the larynx, vocal folds, oesophagus, trachea, bronchus, lung, alveolar sacs, heart and diaphragm.

4.3 PATIENT INTERFACE

FIG. 3 shows a patient interface in the form of a nasal mask in accordance with one form of the present technology.

4.4 RPT DEVICE

4.5 HUMIDIFIER

Figure 5A:
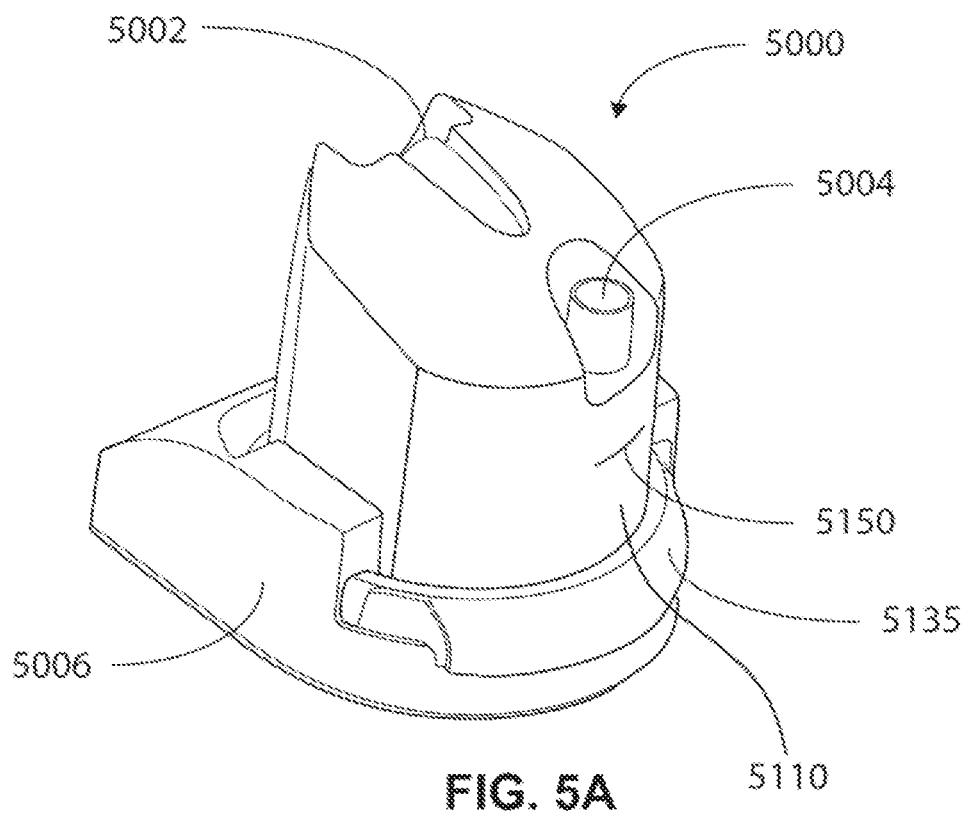

FIG. 5A shows an isometric view of a humidifier in accordance with one form of the present technology.

Figure 5B:
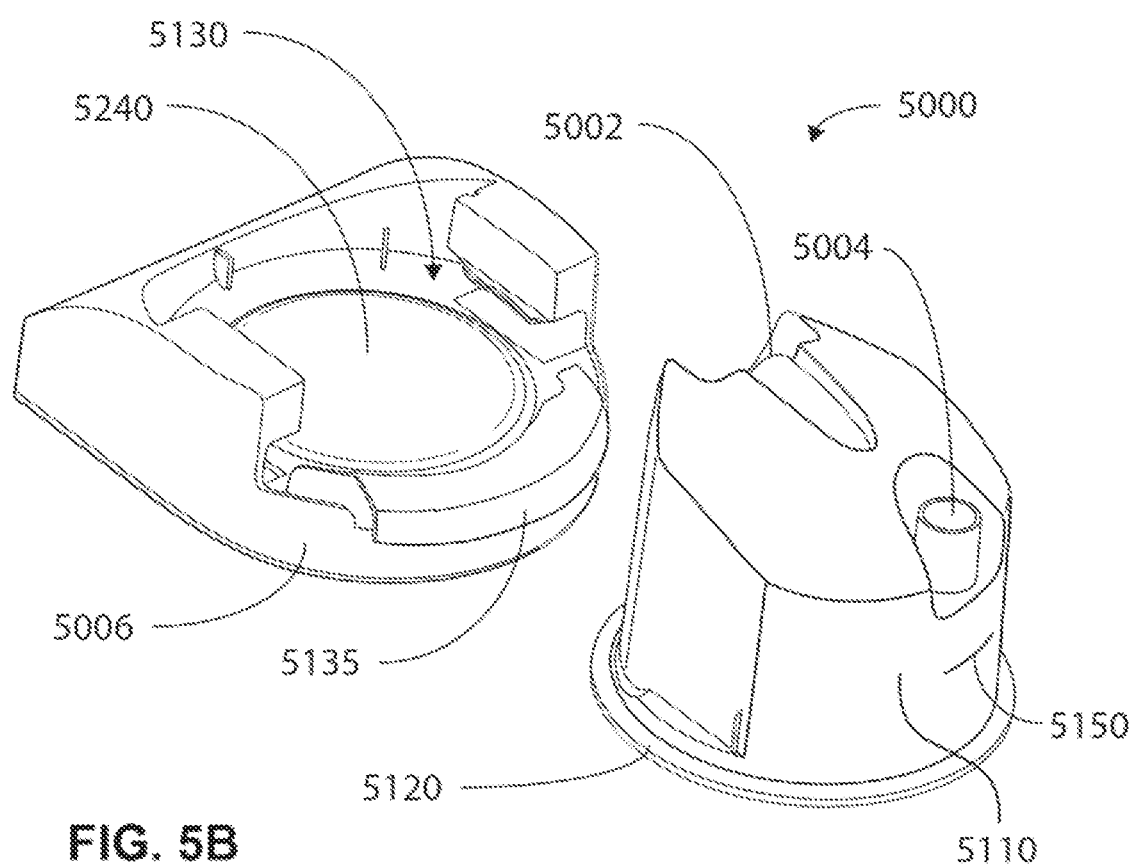

FIG. 5B shows an isometric view of a humidifier in accordance with one form of the present technology, showing a humidifier reservoir 5110 removed from the humidifier reservoir dock 5130.

4.6 BREATHING WAVEFORMS

Figure 6A:
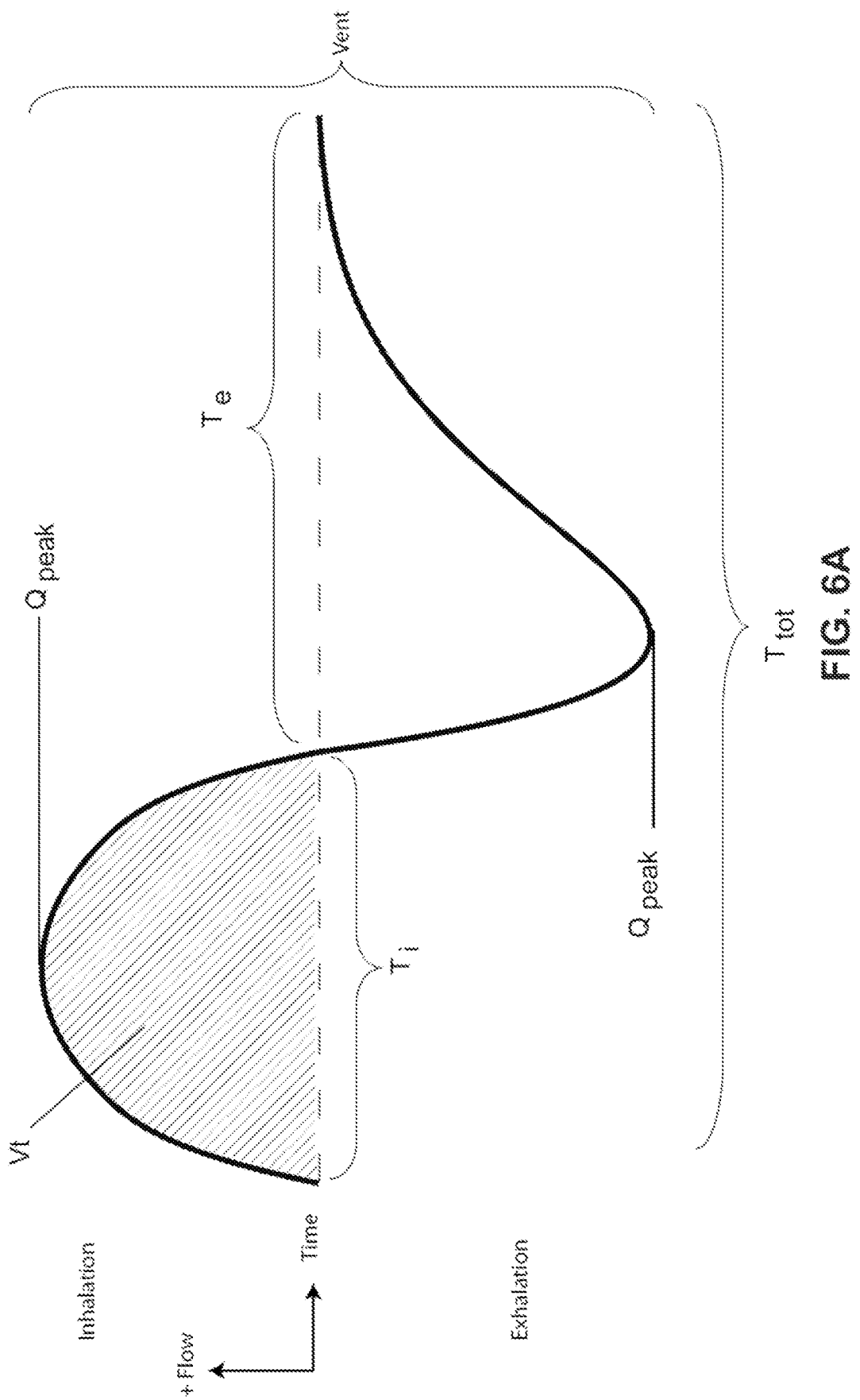

FIG. 6A shows a typical model respiratory flow rate waveform of a person while sleeping. The horizontal axis is time, and the vertical axis is respiratory flow rate. While the parameter values may vary, a typical breath may have the following approximate values: tidal volume, Vt, 0.5 L, inspiratory time, Ti, 1.6 s, peak inspiratory flow rate, Qpeak, 0.4 L/s, expiratory time, Te, 2.4 s, peak expiratory flow rate, Qpeak, −0.5 L/s. The total duration of the breath, Ttot, is about 4 s. The person typically breathes at a rate of about 15 breaths per minute (BPM), with Ventilation, Vent, about 7.5 L/minute. A typical duty cycle, the ratio of Ti to Ttot is about 40%.

Figure 6B:
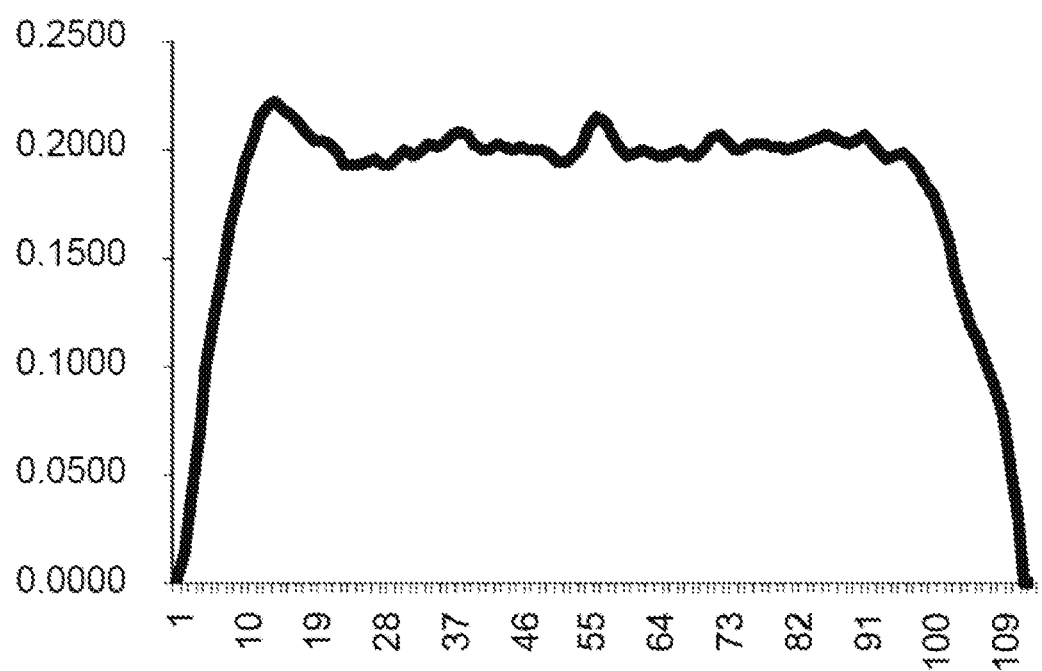

FIG. 6B shows a scaled inspiratory portion of a respiratory flow rate waveform where the patient is experiencing an example of "classical flatness" inspiratory flow limitation.

Figure 6C:
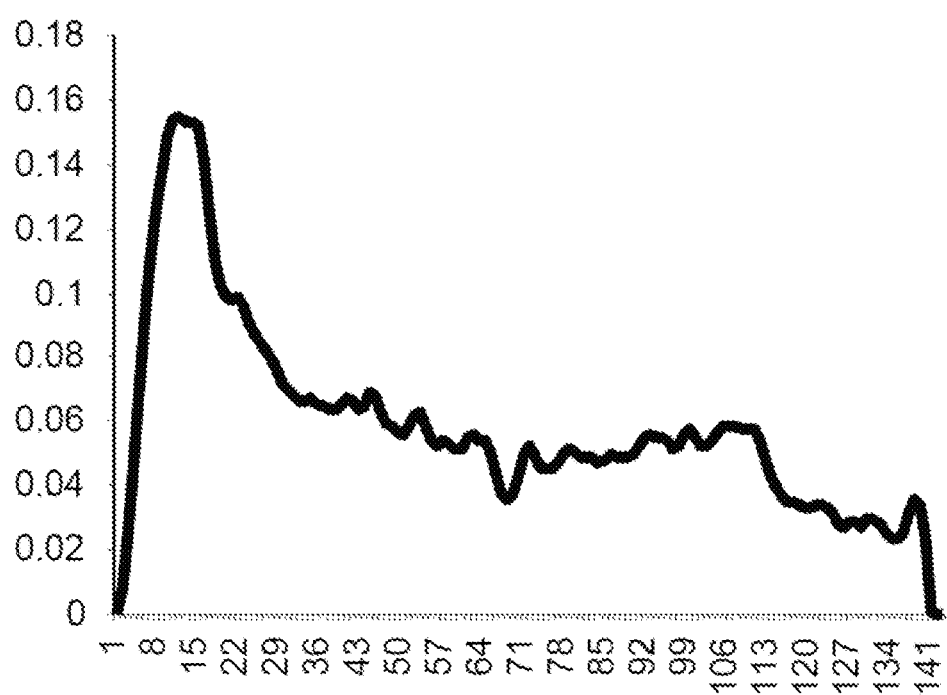

FIG. 6C shows a scaled inspiratory portion of a respiratory flow rate waveform where the patient is experiencing an example of "chair-shaped" (late flatness) inspiratory flow limitation.

Figure 6D:
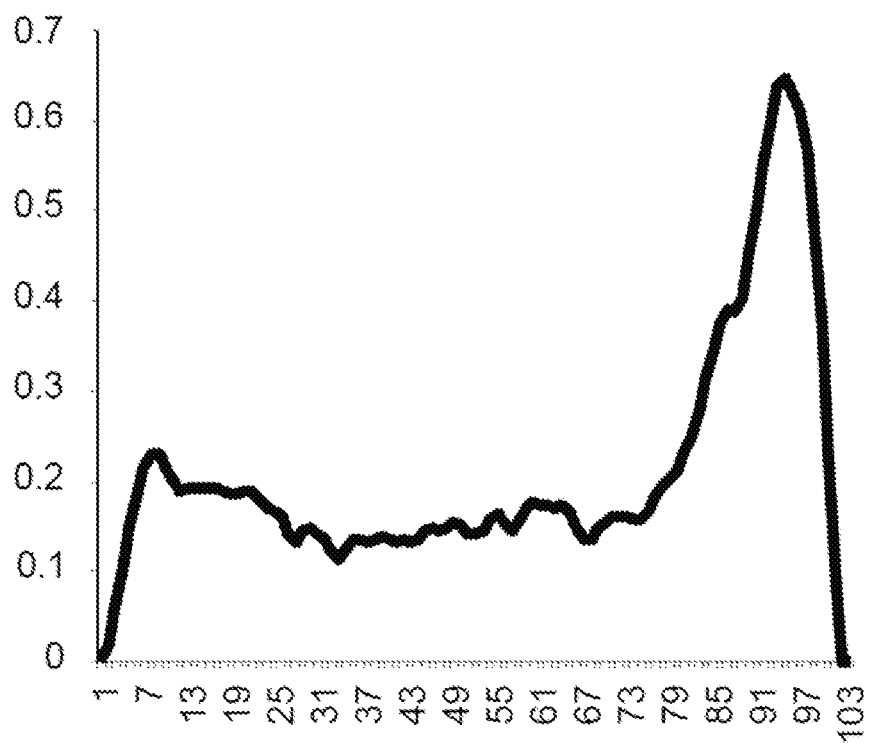

FIG. 6D shows a scaled inspiratory portion of a respiratory flow rate waveform where the patient is experiencing an example of "reverse chair" (early flatness) inspiratory flow limitation.

Figure 6E:
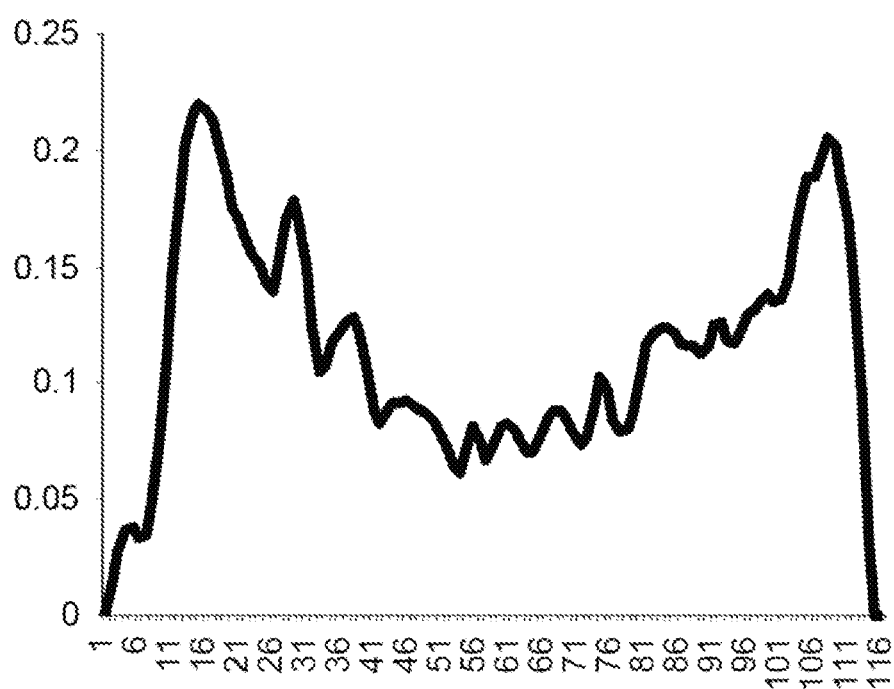

FIG. 6E shows a scaled inspiratory portion of a respiratory flow rate waveform where the patient is experiencing an example of "M-shaped" inspiratory flow limitation.

Figure 6F:
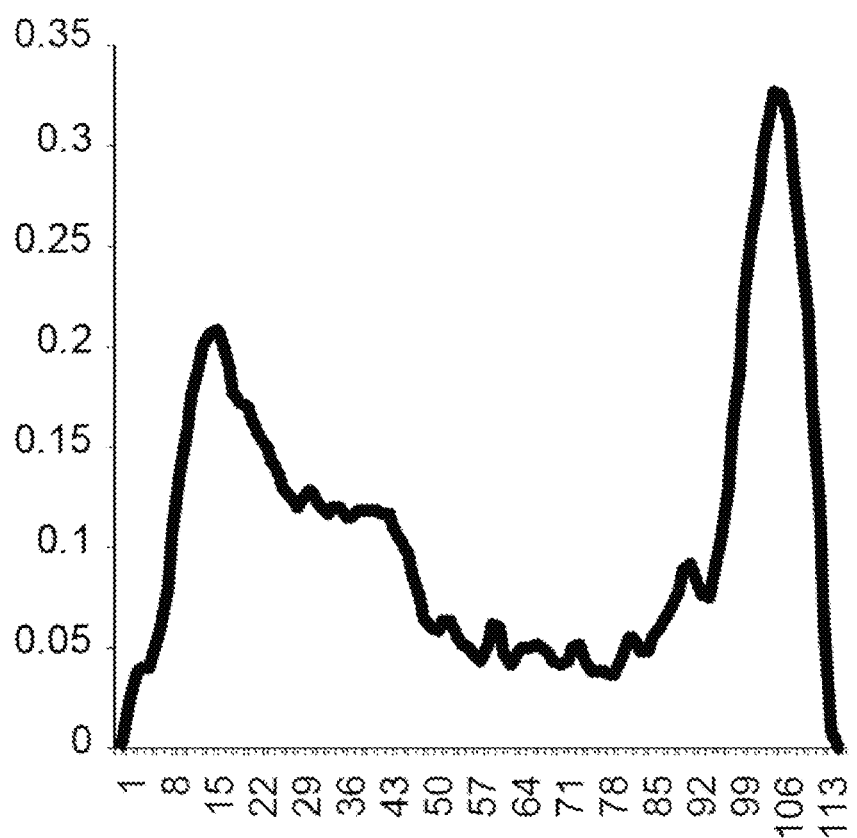

FIG. 6F shows a scaled inspiratory portion of a respiratory flow rate waveform where the patient is experiencing an example of severely "M-shaped" inspiratory flow limitation.

4.7 FLOW RATE SIGNAL ESTIMATION

Figure 7:
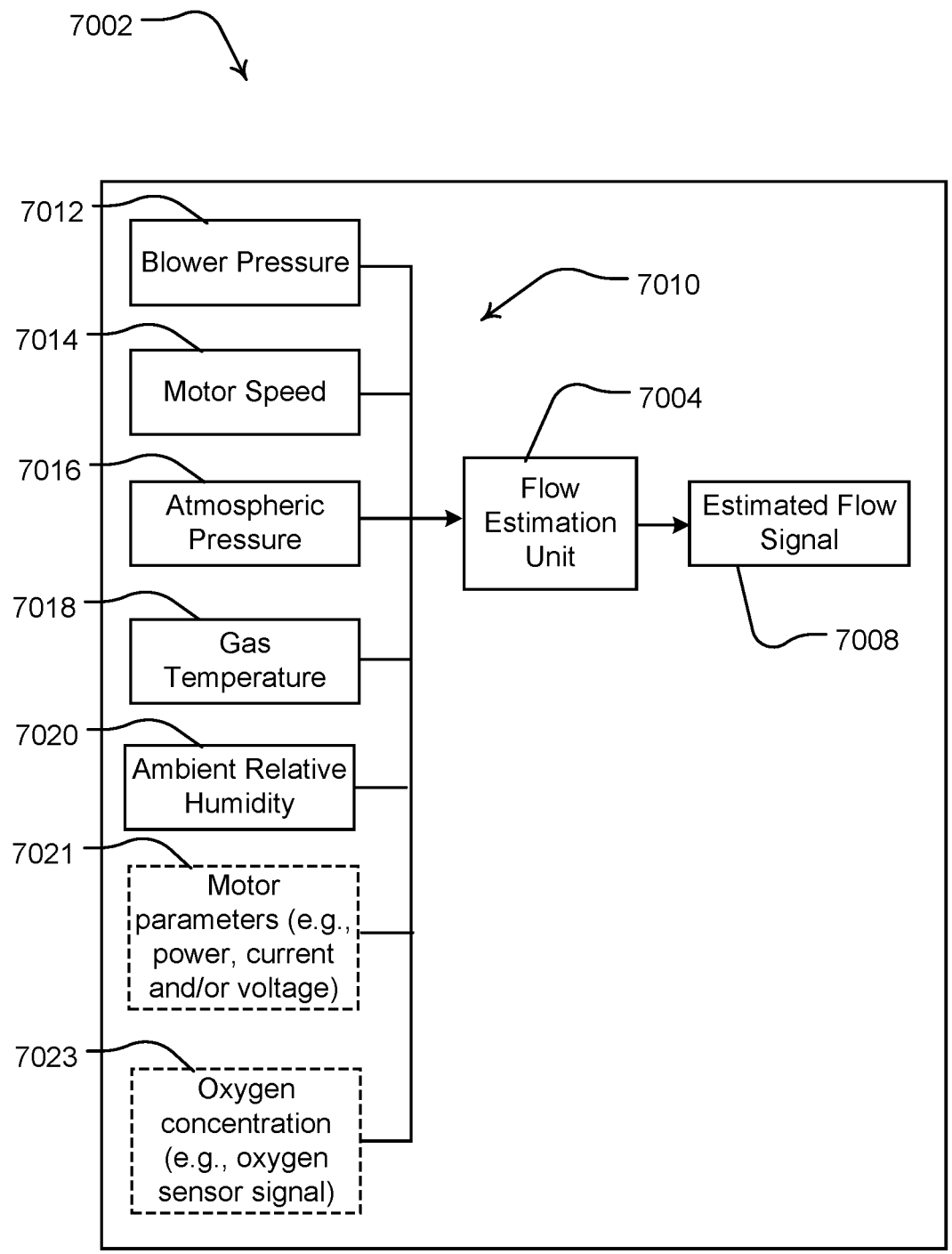

FIG. 7 is an example diagram illustrating a method/system that may be used to implement generation of a signal estimating flow rate such as by the methods described in more detail herein.

Figure 8A:
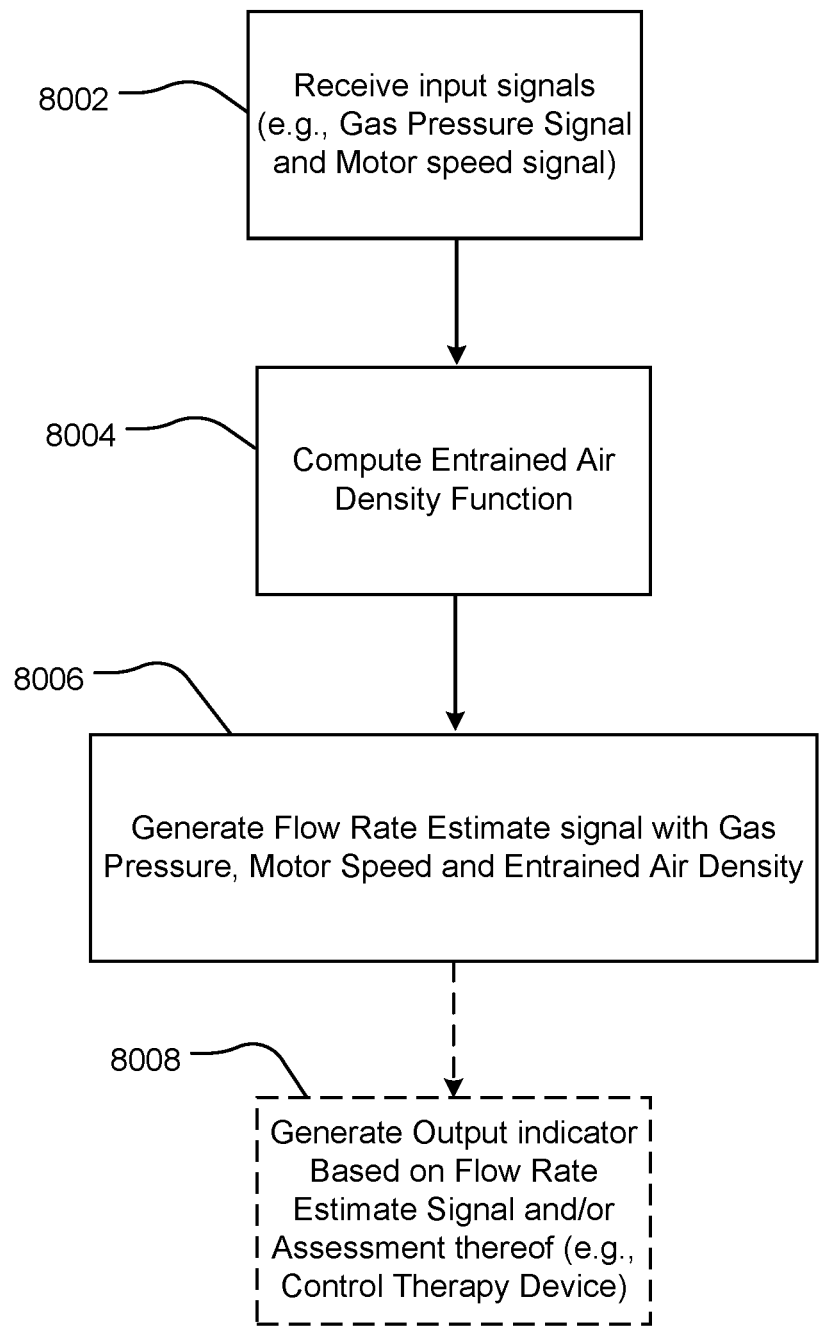

FIG. 8A is an example flow chart illustrating a process for generating a flow rate estimate signal based on input signals such as a gas pressure signal, a motor speed signal and a computed entrained air density function.

Figure 8B:
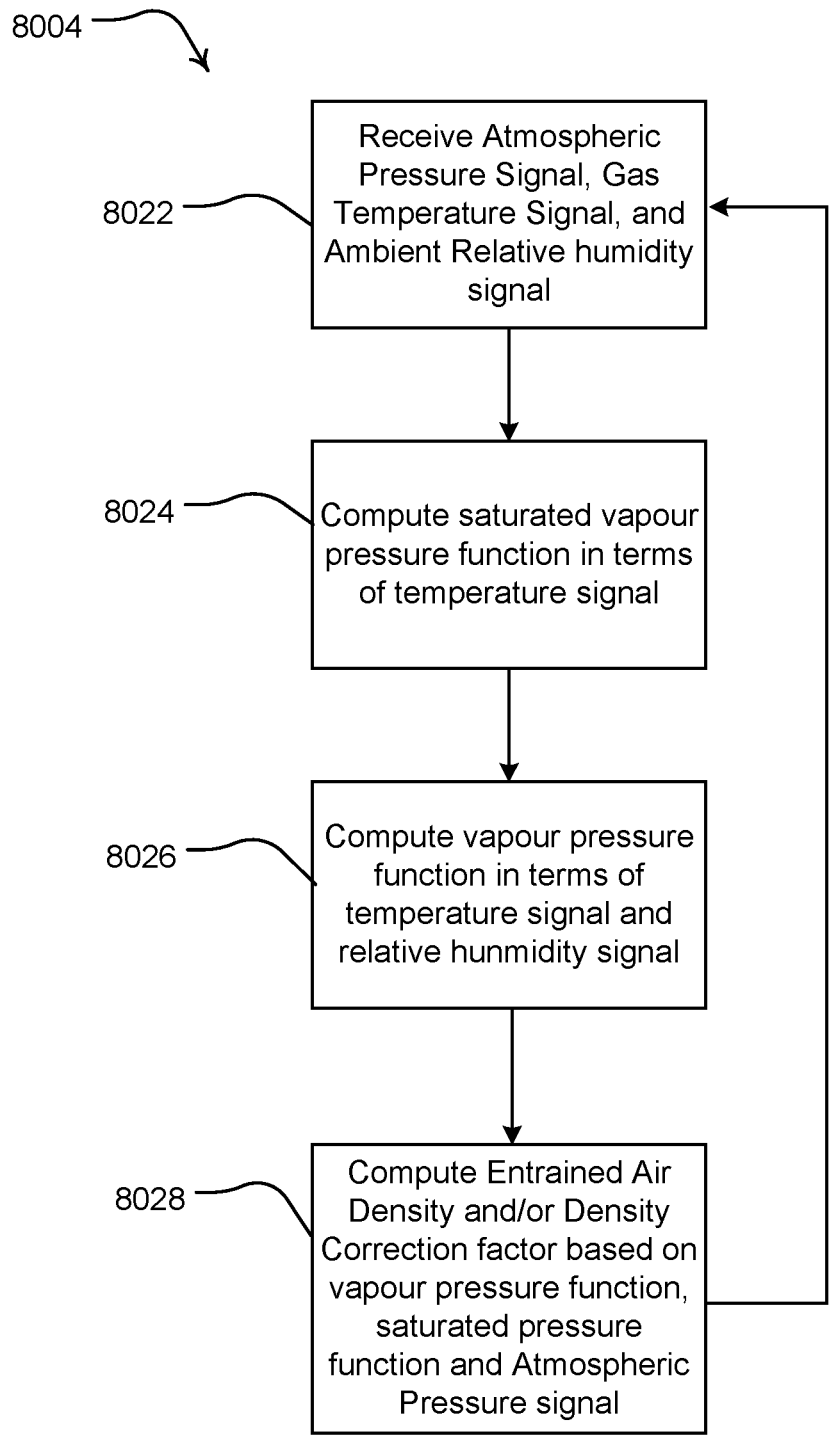

FIG. 8B is an example flow chart illustrating a process for generating an entrained air density function such as to generate a flow rate estimate signal in the example of FIG. 7.

Figure 8C:
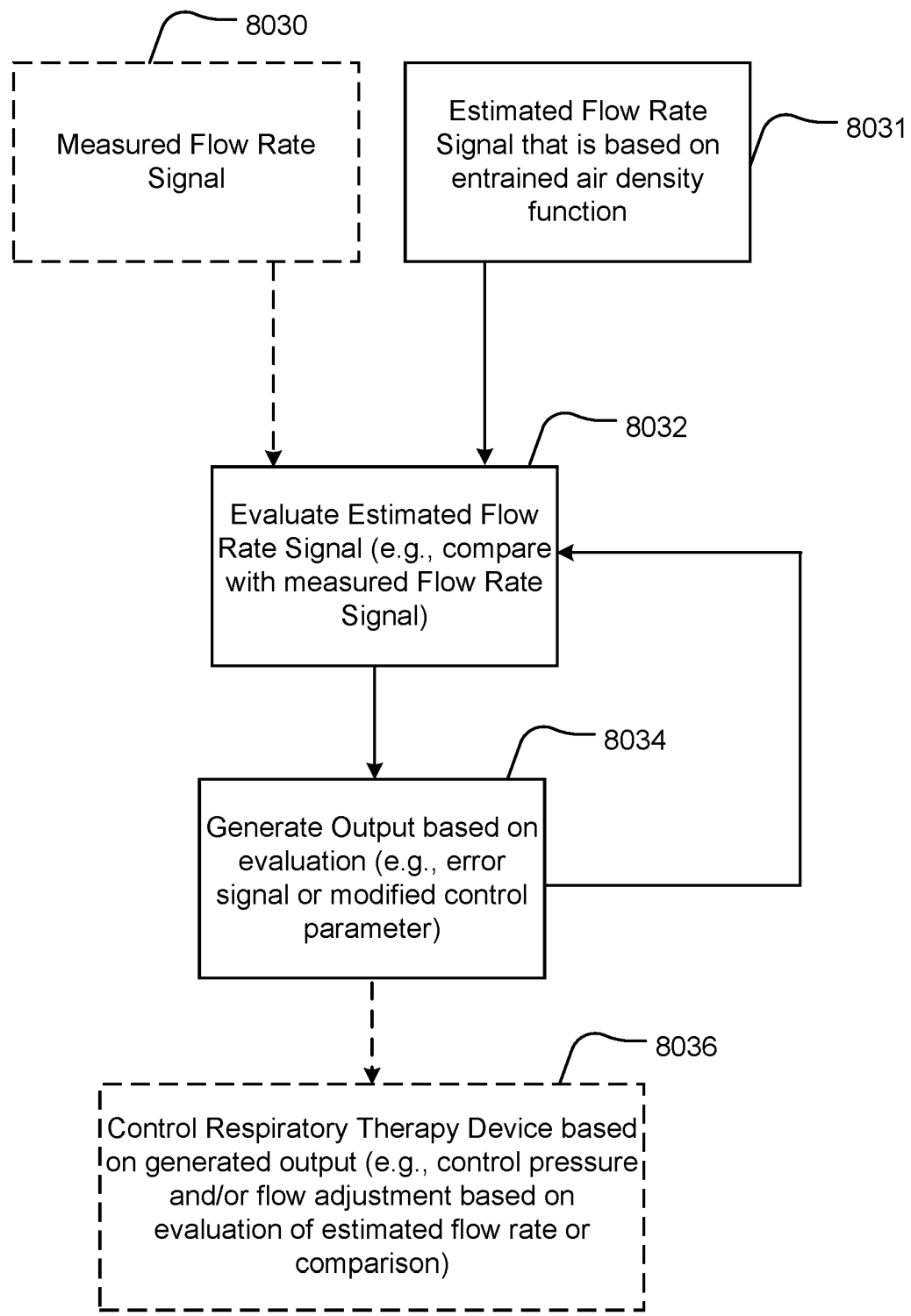

FIG. 8C is an example process for using a flow rate estimate signal in a respiratory apparatus such as an RPT device such as using the system of FIG. 7.

Figure 9A:
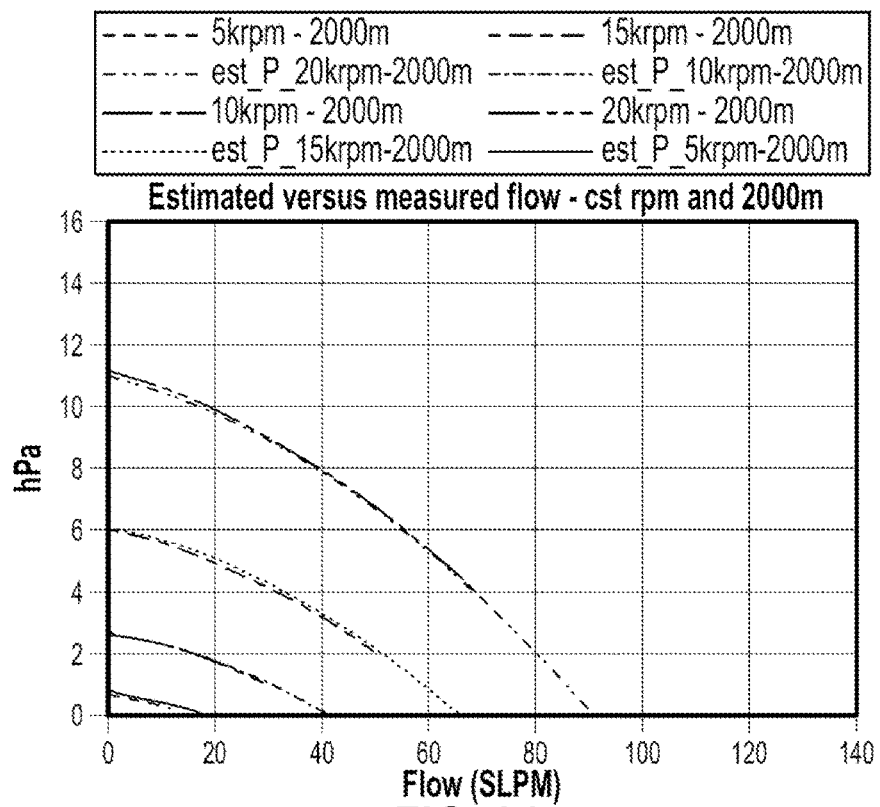
Figure 9B:
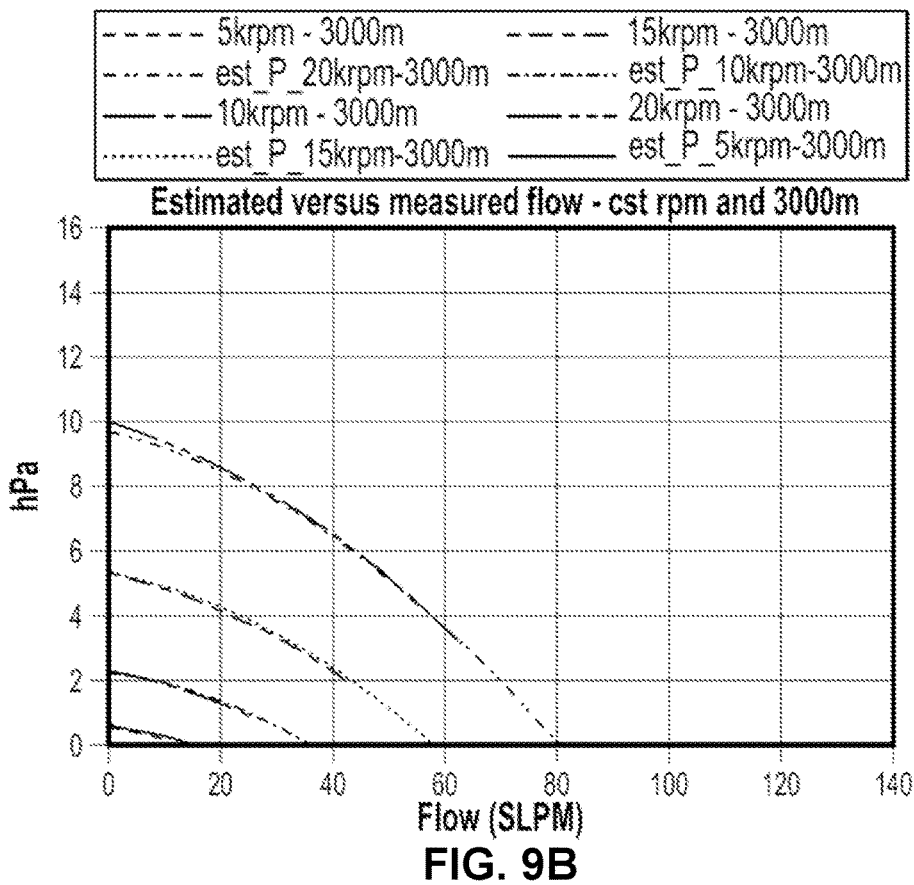

FIGS. 9A and 9B contain a graphs illustrating a comparison of a flow rate signal measured by a flow sensor and a generated flow rate estimate signal with a fan curve of an example RPT device at various altitudes.

Figure 10A:
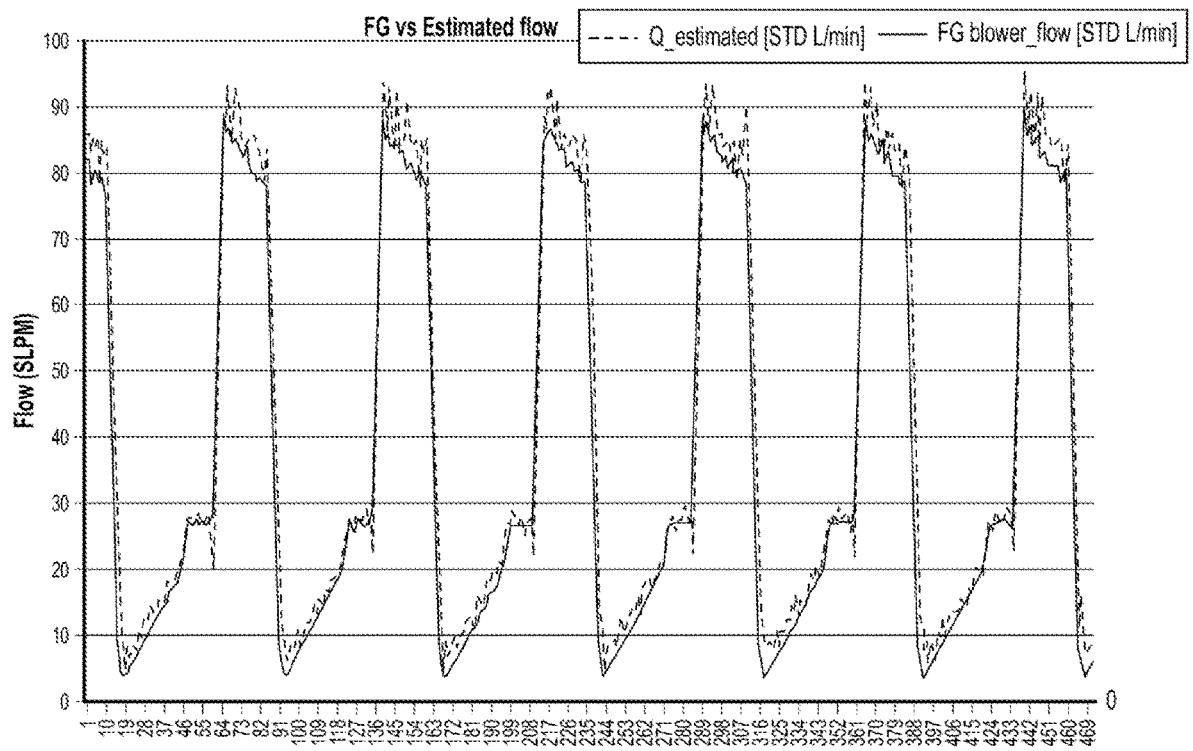
Figure 10B:
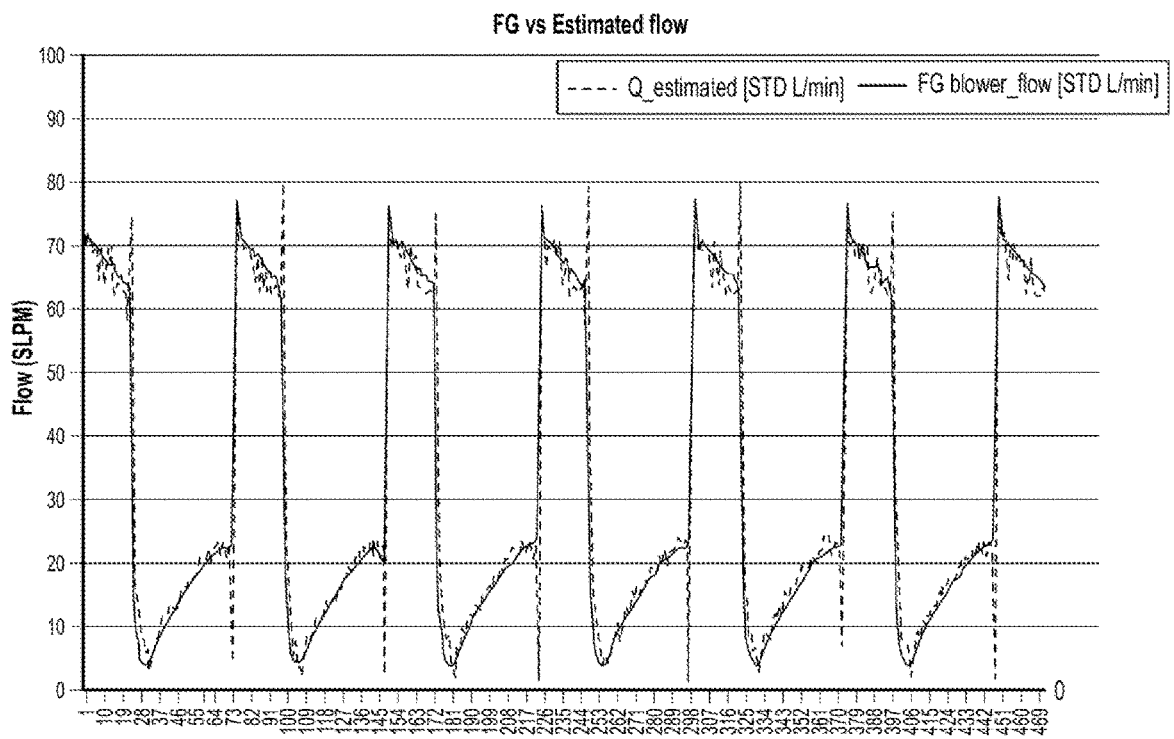

FIGS. 10A and 10B contain a graphs illustrating a comparison of both a flow rate signal measured by a flow sensor and a generated flow rate estimate signal during use of an example RPT device at various altitudes.

5 DETAILED DESCRIPTION OF EXAMPLES OF THE TECHNOLOGY

Before the present technology is described in further detail, it is to be understood that the technology is not limited to the particular examples described herein, which may vary. It is also to be understood that the terminology used in this disclosure is for the purpose of describing only the particular examples discussed herein, and is not intended to be limiting.

The following description is provided in relation to various examples which may share one or more common characteristics and/or features. It is to be understood that one or more features of any one example may be combinable with one or more features of another example or other examples. In addition, any single feature or combination of features in any of the examples may constitute a further example.

5.1 Therapy

In one form, the present technology comprises a method for treating a respiratory disorder comprising the step of delivering air at a positive pressure, or a high flow rate, of air to the entrance of the airways of a patient 1000.

In certain examples of the present technology, a supply of air at positive pressure or high flow is provided to the nasal passages of the patient via one or both nares.

5.2 Treatment Systems

In one form, the present technology comprises an apparatus or device for treating a respiratory disorder. The apparatus or device may comprise an RPT device 4000 for delivering pressurised air to the patient 1000 via an air circuit 4170 to a patient interface 3000. In some versions, the RPT device may be a high flow therapy device that delivers a controlled flow rate of air to the patient through an open patient interface (e.g., a cannula) at rates generally higher than typical inspiration flow rates.

5.3 Patient Interface

A non-invasive patient interface 3000 in accordance with one aspect of the present technology comprises the following functional aspects: a seal-forming structure 3100, a plenum chamber 3200, a positioning and stabilising structure 3300, a vent 3400, one form of connection port 3600 for connection to air circuit 4170, and a forehead support 3700. In some forms a functional aspect may be provided by one or more physical components. In some forms, one physical component may provide one or more functional aspects. In use the seal-forming structure 3100 is arranged to surround an entrance to the airways of the patient so as to facilitate the delivery of air at positive pressure to the airways. Other patient interface devices may be utilized depending on the type of therapy provided by the RPT.

5.4 RPT Device

An RPT device 4000 in accordance with one aspect of the present technology comprises mechanical and pneumatic components 4100, electrical components 4200 and is configured to execute one or more algorithms 4300. The RPT device may have an external housing 4010, formed in two parts, an upper portion 4012 and a lower portion 4014. Furthermore, the external housing 4010 may include one or more panel(s) 4015. The RPT device 4000 comprises a chassis 4016 that supports one or more internal components of the RPT device 4000. The RPT device 4000 may include a handle 4018.

The pneumatic path of the RPT device 4000 may comprise one or more air path items, e.g., an inlet air filter 4112, an inlet muffler 4122, a pressure generator 4140 capable of delivering air at positive pressure (e.g., a blower 4142), an outlet muffler 4124 and one or more transducers 4270, such as pressure sensors 4272 and flow rate sensors 4274.

One or more of the air path items may be located within a removable unitary structure which will be referred to as a pneumatic block 4020. The pneumatic block 4020 may be located within the external housing 4010. In one form a pneumatic block 4020 is supported by, or formed as part of the chassis 4016.

The RPT device 4000 may have an electrical power supply 4210, one or more input devices 4220, a central controller 4230, a therapy device controller 4240, a pressure generator 4140, one or more protection circuits 4250, memory 4260, transducers 4270, data communication interface 4280 and one or more output devices 4290. Electrical components 4200 may be mounted on a single Printed Circuit Board Assembly (PCBA) 4202. In an alternative form, the RPT device 4000 may include more than one PCBA 4202.

5.4.1 RPT Device Mechanical & Pneumatic Components

An RPT device may comprise one or more of the following components in an integral unit. In an alternative form, one or more of the following components may be located as respective separate units.

5.4.1.1 Air Filter(s)

An RPT device in accordance with one form of the present technology may include an air filter 4110, or a plurality of air filters 4110.

In one form, an inlet air filter 4112 is located at the beginning of the pneumatic path upstream of a pressure generator 4140.

In one form, an outlet air filter 4114, for example an antibacterial filter, is located between an outlet of the pneumatic block 4020 and a patient interface 3000.

5.4.1.2 Muffler(s)

In one form of the present technology, an inlet muffler 4122 is located in the pneumatic path upstream of a pressure generator 4140.

In one form of the present technology, an outlet muffler 4124 is located in the pneumatic path between the pressure generator 4140 and a patient interface 3000.

5.4.1.3 Pressure Generator

In one form of the present technology, a pressure generator 4140 for delivering a flow, or a supply, of air at positive pressure is a controllable blower 4142. For example, the blower 4142 may include a brushless DC motor 4144 with one or more impellers housed in a volute. The blower may be capable of delivering a supply of air, for example at a rate of up to about 120 litres/minute, at a positive pressure in a range from about 4 cmH$_2$O to about 20 cmH$_2$O, or in other forms up to about 30 cmH$_2$O. The blower may be as described in any one of the following patents or patent applications the contents of which are incorporated herein by reference in their entirety: U.S. Pat. Nos. 7,866,944; 8,638,014; 8,636,479; and PCT Patent Application Publication No. WO 2013/020167.

The pressure generator 4140 is under the control of the therapy device controller 4240.

In other forms, a pressure generator 4140 may be a piston-driven pump, a pressure regulator connected to a high-pressure source (e.g. compressed air reservoir), or a bellows.

5.4.1.4 Transducer(s)

Transducers may be internal of the RPT device, or external of the RPT device. External transducers may be located for example on or form part of the air circuit, e.g., the patient interface. External transducers may be in the form of non-contact sensors such as a Doppler radar movement sensor that transmit or transfer data to the RPT device.

In one form of the present technology, one or more transducers 4270 are located upstream and/or downstream of the pressure generator 4140. The one or more transducers 4270 may be constructed and arranged to measure properties such as a flow rate, a pressure or a temperature at that point in the pneumatic path.

In one form of the present technology, one or more transducers 4270 may be located proximate to the patient interface 3000.

In one form, a signal from a transducer 4270 may be filtered, such as by low-pass, high-pass or band-pass filtering.

5.4.1.4.1 Flow Rate Sensor

A flow rate sensor 4274 in accordance with the present technology may be based on a differential pressure transducer, for example, an SDP600 Series differential pressure transducer from SENSIRION. In some versions, the present technology may be implemented without a flow rate sensor, such as where a flow rate estimate signal is generated based on other sensor signals (i.e., not a flow rate sensor signal).

In one form, a signal representing a flow rate such as a total flow rate Qt from the flow rate sensor 4274, and/or an estimate thereof, is received by the central controller 4230.

5.4.1.4.2 Pressure Sensor

A pressure sensor 4272 in accordance with the present technology is located in fluid communication with the pneumatic path. Thus, the pressure sensor 4272 measures the pressure characteristic of the gas within the pneumatic path (e.g., a pressure generated by a blower of the RPT). An example of a suitable pressure transducer is a sensor from the HONEYWELL ASDX series. An alternative suitable pressure transducer is a sensor from the NPA Series from GENERAL ELECTRIC.

In one form, a signal from the pressure sensor 4272 is received by the central controller 4230.

5.4.1.4.3 Motor Speed Transducer

In one form of the present technology a motor speed transducer 4276 or sensor is used to determine a rotational velocity of the motor 4144 and/or the blower 4142. A motor speed signal from the motor speed transducer 4276 may be provided to the therapy device controller 4240. The motor speed transducer 4276 may, for example, be a speed sensor, such as a Hall effect sensor.

5.4.1.4.4 Gas Temperature Sensor

In some versions of the present technology, a gas temperature sensor 4275. In some such implementations, the gas temperature sensor may be a component of another sensor such as a Sensirion SDP-872 flow sensor (e.g., a hot wire sensor) that can generate temperature and flow rate signals but may be an independent temperature sensor or other temperature sensing device. Such a sensor may generate a signal (e.g., electronic) representing measured temperature of gas (air) in, or related to, the gas of the pneumatic path of the RPT. Such a measure may alternatively represent the gas that is ambient to the pneumatic flow path of the RPT. Such a sensor may be located on a PCB of the RPT, for example. The sensor may generate the sensed temperature in analog and/or digital signals and may be accessed by a processor of the controller 4230 via a sampled signal and/or a memory containing temperature values from such a sensor signal.

5.4.1.4.5 Atmospheric Pressure Sensor

In some versions of the present technology, atmospheric pressure sensor 4277. For example, an atmospheric pressure sensor of the RPT (e.g., on a PCB of the RPT) configured to measure atmospheric pressure (i.e., pressure outside of the pneumatic flow path of the RPT). The sensor may generate the sensed atmospheric pressure in analog and/or digital signals and may be accessed by a processor of the controller 4230 via a sampled signal and/or a memory containing atmospheric pressure values from such a sensor signal.

5.4.1.4.6 Ambient Relative Humidity Sensor

In some versions of the present technology, ambient relative humidity sensor 4279. For example, a relative humidity sensor of the RPT (e.g., on a PCB of the RPT) configured to measure ambient relative humidity (i.e., relative humidity outside of the pneumatic flow path of the RPT). The sensor may generate the sensed relative humidity in analog and/or digital signals and may be accessed by a processor of the controller 4230 via a sampled signal and/or a memory containing relative humidity values, such as a percentage value, from such a sensor signal.

5.4.1.4.7 Oxygen Sensor

Some versions of the present technology may optionally include one or more oxygen sensors, such as to generate an oxygen sensor signal 7021, adapted to determine an oxygen concentration of gas passing through the pneumatic path of the apparatus such as the RPT. In an implementation, the oxygen concentration of gas passing through respiratory conduit is estimated using an oxygen sensor 7023. An oxygen sensor is a device configured to measure oxygen concentration in a gas. Examples of oxygen sensors include, but are not limited to, ultrasonic oxygen sensors, electrical oxygen sensors, chemical oxygen sensors, and optical oxygen sensors. In one implementation, oxygen sensor 7023 may be an ultrasonic oxygen sensor that includes an ultrasonic emitter and an ultrasonic receiver.

5.4.1.4.8 Other Motor Parameter Sensor(s)

Some versions of the present technology may optionally include one or more sensors or circuit elements for determining or sensing other motor parameters signal(s) 7021 such as motor current, motor voltage and/or motor power. For example, one or more sense resistor(s) may be employed to measure currents and/or voltage supplied to the motor of the blower. In some versions, such as with a measured current and a known or measured voltage, an instantaneous power of the motor may be computed (e.g., current× voltage=power) such as with a central controller of the apparatus.

5.4.1.5 Anti-Spill Back Valve

In one form of the present technology, an anti-spill back valve is located between the humidifier 5000 and the pneumatic block 4020. The anti-spill back valve is constructed and arranged to reduce the risk that water will flow upstream from the humidifier 5000, for example to the motor 4144.

5.4.1.6 Air Circuit

An air circuit 4170 in accordance with an aspect of the present technology is a conduit or a tube constructed and arranged in use to allow a flow of air to travel between two components such as the pneumatic block 4020 and the patient interface 3000.

In particular, the air circuit 4170 may be in fluid connection with the outlet of the pneumatic block and the patient interface. The air circuit may be referred to as an air delivery tube. In some cases there may be separate limbs of the circuit for inspiration and expiration. In other cases a single limb is used.

In some forms, the air circuit 4170 may comprise one or more heating elements configured to heat air in the air circuit, for example to maintain or raise the temperature of the air. The heating element may be in a form of a heated wire circuit, and may comprise one or more transducers, such as temperature sensors. In one form, the heated wire circuit may be helically wound around the axis of the air circuit 4170. The heating element may be in communication with a controller such as a central controller 4230 or a humidifier controller 5250. One example of an air circuit 4170 comprising a heated wire circuit is described in United States Patent Application No. US/2011/0023874, which is incorporated herewithin in its entirety by reference.

5.4.1.7 Oxygen Delivery

In one form of the present technology, supplemental oxygen 4180 is delivered to one or more points in the pneumatic path, such as upstream of the pneumatic block 4020, to the air circuit 4170 and/or to the patient interface 3000.

5.4.2 RPT Device Electrical Components

5.4.2.1 Power Supply

A power supply 4210 may be located internal or external of the external housing 4010 of the RPT device 4000.

In one form of the present technology, power supply 4210 provides electrical power to the RPT device 4000 only. In another form of the present technology, power supply 4210 provides electrical power to both RPT device 4000 and humidifier 5000.

5.4.2.2 Input Devices

In one form of the present technology, an RPT device 4000 includes one or more input devices 4220 in the form of buttons, switches or dials to allow a person to interact with the device. The buttons, switches or dials may be physical devices, or software devices accessible via a touch screen. The buttons, switches or dials may, in one form, be physically connected to the external housing 4010, or may, in another form, be in wireless communication with a receiver that is in electrical connection to the central controller 4230.

In one form, the input device 4220 may be constructed and arranged to allow a person to select a value and/or a menu option.

5.4.2.3 Central Controller

In one form of the present technology, the central controller 4230 is one or a plurality of processors suitable to control an RPT device 4000.

Suitable processors may include an x86 INTEL processor, a processor based on ARM® Cortex®-M processor from ARM Holdings such as an STM32 series microcontroller from ST MICROELECTRONIC. In certain alternative forms of the present technology, a 32-bit RISC CPU, such as an STR9 series microcontroller from ST MICROELECTRONICS or a 16-bit RISC CPU such as a processor from the MSP430 family of microcontrollers, manufactured by TEXAS INSTRUMENTS may also be suitable.

In one form of the present technology, the central controller 4230 is a dedicated electronic circuit.

In one form, the central controller 4230 is an application-specific integrated circuit. In another form, the central controller 4230 comprises discrete electronic components.

The central controller 4230 may be configured to receive input signal(s) from one or more transducers 4270, and one or more input devices 4220.

The central controller 4230 may be configured to provide output signal(s) to one or more of an output device 4290, a therapy device controller 4240, a data communication interface 4280 and humidifier controller 5250.

In some forms of the present technology, the central controller 4230 is configured to implement the one or more methodologies described herein, such as the one or more algorithms 4300 expressed as computer programs stored in a non-transitory computer readable storage medium, such as memory 4260. In some forms of the present technology, the central controller 4230 may be integrated with an RPT device 4000. However, in some forms of the present technology, some methodologies may be performed by a remotely located device. For example, the remotely located device may determine control settings for a ventilator or detect respiratory related events by analysis of stored data such as from any of the sensors described herein.

5.4.2.4 Clock

The RPT device 4000 may include a clock 4232 that is connected to the central controller 4230.

5.4.2.5 Therapy Device Controller

In one form of the present technology, therapy device controller 4240 is a therapy control module 4330 that forms part of the algorithms 4300 executed by the central controller 4230.

In one form of the present technology, therapy device controller 4240 is a dedicated motor control integrated circuit. For example, in one form a MC33035 brushless DC motor controller, manufactured by ONSEMI is used.

5.4.2.6 Protection Circuits

The one or more protection circuits 4250 in accordance with the present technology may comprise an electrical protection circuit, a temperature and/or pressure safety circuit.

5.4.2.7 Memory

In accordance with one form of the present technology the RPT device 4000 includes memory 4260, e.g., non-volatile memory. In some forms, memory 4260 may include battery powered static RAM. In some forms, memory 4260 may include volatile RAM.

Memory 4260 may be located on the PCBA 4202. Memory 4260 may be in the form of EEPROM, or NAND flash.

Additionally or alternatively, RPT device 4000 includes a removable form of memory 4260, for example a memory card made in accordance with the Secure Digital (SD) standard.

In one form of the present technology, the memory 4260 acts as a non-transitory computer readable storage medium on which is stored computer program instructions expressing the one or more methodologies described herein, such as the one or more algorithms 4300 including, for example, the methodologies described in relation to flow rate estimation described in more detail herein. The memory 4260 may also act as a volatile or non-volatile storage medium for data acquired, collected, used or generated as one or more of the methodologies described herein are executed as instructions by one or more processors.

5.4.2.8 Data Communication Systems

In one form of the present technology, a data communication interface 4280 is provided, and is connected to the central controller 4230. Data communication interface 4280 may be connectable to a remote external communication network 4282 and/or a local external communication network 4284. The remote external communication network 4282 may be connectable to a remote external device 4286. The local external communication network 4284 may be connectable to a local external device 4288.

In one form, data communication interface 4280 is part of the central controller 4230. In another form, data communication interface 4280 is separate from the central controller 4230, and may comprise an integrated circuit or a processor.

In one form, remote external communication network 4282 is the Internet. The data communication interface 4280 may use wired communication (e.g. via Ethernet, or optical fibre) or a wireless protocol (e.g. CDMA, GSM, LTE) to connect to the Internet.

In one form, local external communication network 4284 utilises one or more communication standards, such as Bluetooth, or a consumer infrared protocol.

In one form, remote external device 4286 is one or more computers, for example a cluster of networked computers. In one form, remote external device 4286 may be virtual computers, rather than physical computers. In either case, such a remote external device 4286 may be accessible to an appropriately authorised person such as a clinician.

The local external device 4288 may be a personal computer, mobile phone, tablet or remote control.

5.4.2.9 Output Devices Including Optional Display, Alarms

An output device 4290 in accordance with the present technology may take the form of one or more of a visual, audio and haptic unit. A visual display may be a Liquid Crystal Display (LCD) or Light Emitting Diode (LED) display.

5.4.2.9.1 Display Driver

A display driver 4292 receives as an input the characters, symbols, or images intended for display on the display 4294, and converts them to commands that cause the display 4294 to display those characters, symbols, or images.

5.4.2.9.2 Display

A display 4294 is configured to visually display characters, symbols, or images in response to commands received from the display driver 4292. For example, the display 4294 may be an eight-segment display, in which case the display driver 4292 converts each character or symbol, such as the figure "0", to eight logical signals indicating whether the eight respective segments are to be activated to display a particular character or symbol.

5.4.3 RPT Device Algorithms

5.4.3.1 Pre-Processing Module

A pre-processing module 4310 in accordance with one form of the present technology receives as an input a signal from a transducer 4270, for example a flow rate sensor 4274 or pressure sensor 4272, and performs one or more process steps to calculate one or more output values that will be used as an input to another module, for example a therapy engine module 4320.

In one form of the present technology, the output values include the interface or mask pressure Pm, the respiratory flow rate Qr, and the leak flow rate Ql.

In various forms of the present technology, the pre-processing module 4310 comprises one or more of the following algorithms: pressure compensation 4312, vent flow rate estimation 4314, leak flow rate estimation 4316, flow rate signal estimation 4317 and respiratory flow rate estimation 4318.

5.4.3.1.1 Pressure Compensation

In one form of the present technology, a pressure compensation algorithm 4312 receives as an input a signal indicative of the pressure in the pneumatic path proximal to an outlet of the pneumatic block. The pressure compensation algorithm 4312 estimates the pressure drop through the air circuit 4170 and provides as an output an estimated pressure, Pm, in the patient interface 3000.

5.4.3.1.2 Vent Flow Rate Estimation

In one form of the present technology, a vent flow rate estimation algorithm 4314 receives as an input an estimated pressure, Pm, in the patient interface 3000 and estimates a vent flow rate of air, Qv, from a vent 3400 in a patient interface 3000.

5.4.3.1.3 Leak Flow Rate Estimation

In one form of the present technology, a leak flow rate estimation algorithm 4316 receives as an input a total flow rate, Qt, and a vent flow rate Qv, and provides as an output an estimate Ql of the leak flow rate. In one form, the leak flow rate estimation algorithm 4316 estimates the leak flow rate Ql by calculating an average of the difference between total flow rate Qt and vent flow rate Qv over a period sufficiently long to include several breathing cycles, e.g. about 10 seconds.

In one form, the leak flow rate estimation algorithm 4316 receives as an input a total flow rate Qt, a vent flow rate Qv, and an estimated pressure, Pm, in the patient interface 3000, and provides as an output a leak flow rate Ql, by calculating a leak conductance, and determining a leak flow rate Ql to be a function of leak conductance and pressure, Pm. Leak conductance is calculated as the quotient of low pass filtered non-vent flow rate equal to the difference between total flow rate Qt and vent flow rate Qv, and low pass filtered square root of pressure Pm, where the low pass filter time constant has a value sufficiently long to include several breathing cycles, e.g. about 10 seconds. The leak flow rate Ql may be estimated as the product of leak conductance and a function of pressure, Pm.

5.4.3.1.4 Respiratory Flow Rate Estimation

In one form of the present technology, a respiratory flow rate estimation algorithm 4318 receives as an input a total flow rate, Qt, a vent flow rate, Qv, and a leak flow rate, Ql, and estimates a respiratory flow rate of air, Qr, to the patient, by subtracting the vent flow rate Qv and the estimated leak flow rate Ql from the total flow rate Qt.

5.4.3.1.5 Flow Rate Signal Estimation

In one form of the present technology, a flow rate signal may be estimated by a flow rate signal estimation algorithm 4317 such as to generate an estimate of a total flow rate, Qt, a vent flow rate, Qv, and a leak flow rate, Ql, and further estimates of a respiratory flow rate of air, Qr, to the patient, by subtracting the vent flow rate Qv and the estimated leak flow rate Ql from the estimated total flow rate Qt. Such a flow rate signal estimation process is described in more detail herein. Such a flow rate signal estimate may be utilized in place of a flow rate signal from a flow sensor such as if a fault is detected in the operation of a flow sensor. Similarly, such a flow rate signal estimate may be utilized to detect a fault in the operation of a flow sensor or otherwise to evaluate the accuracy of the flow rate sensor as discussed in more detail herein.

5.4.3.2 Therapy Engine Module

In one form of the present technology, a therapy engine module 4320 receives as inputs one or more of a pressure, Pm, in a patient interface 3000, and a respiratory flow rate of air to a patient, Qr, such as one derived from the flow rate estimate signal, and provides as an output one or more therapy parameters.

In one form of the present technology, a therapy parameter is a treatment pressure Pt.

In various forms, the therapy engine module 4320 comprises one or more of the following algorithms: phase determination 4321, waveform determination 4322, ventilation determination 4323, inspiratory flow limitation detection 4324, apnea detection 4325, inspiratory M-shape detection 4326, airway patency determination 4327, typical recent ventilation determination 4328, and therapy parameter determination 4329.

5.4.3.2.1 Phase Determination

In one form of the present technology, a phase determination algorithm 4321 receives as an input a signal indicative of respiratory flow rate, Qr, and provides as an output a phase $\Phi$ of a current breathing cycle of a patient 1000.

In some forms, known as discrete phase determination, the phase output $\Phi$ is a discrete variable. One implementation of discrete phase determination provides a bi-valued phase output $\Phi$ with values of either inspiration or expiration, for example represented as values of 0 and 0.5 revolutions respectively, upon detecting the start of spontaneous inspiration and expiration respectively. RPT devices 4000 that "trigger" and "cycle" effectively perform discrete phase determination, since the trigger and cycle instants are the instants at which the phase changes from expiration to inspiration and from inspiration to expiration, respectively. In one implementation of bi-valued phase determination, the phase output $\Phi$ is determined to have a discrete value of 0 (indicative of inspiration) when the respiratory flow rate Qr exceeds a "trigger threshold" (thereby triggering the RPT device 4000 to deliver a "spontaneous breath"), and a discrete value of 0.5 revolutions (indicative of expiration) when the respiratory flow rate Qr falls below a "cycle threshold" (thereby "spontaneously cycling" the RPT device 4000). In some such implementations, the trigger and cycle thresholds may vary with time during a breath according to respective trigger and cycle threshold functions. Such functions are described in the Patent Cooperation Treaty patent application number PCT/AU2005/000895, published as WO 2006/000017, to ResMed Limited, the entire contents of which are herein incorporated by reference.

In some such implementations, cycling may be prevented during a "refractory period" (denoted as Timin) after the last trigger instant, and, absent spontaneous cycling, must occur within an interval (denoted as Timax) after the last trigger instant. The values of Timin and Timax are settings of the RPT device 4000, and may be set for example by hard-coding during configuration of the RPT device 4000 or by manual entry through the input device 4220.

In other forms, known as continuous phase determination, the phase output Φ is a continuous variable, for example varying from 0 to 1 revolutions, or 0 to 2 π radians. RPT devices 4000 that perform continuous phase determination may trigger and cycle when the continuous phase reaches 0 and 0.5 revolutions, respectively. In one implementation of continuous phase determination, the inspiratory time Ti and the expiratory time Te are first estimated from the respiratory flow rate Qr. The phase Φ is then determined as the half the proportion of the inspiratory time Ti that has elapsed since the previous trigger instant, or 0.5 revolutions plus half the proportion of the expiratory time Te that has elapsed since the previous cycle instant (whichever was more recent).

In some implementations, suitable for ventilation therapy (described below), the phase determination algorithm 4321 is configured to trigger even when the respiratory flow rate Qr is insignificant, such as during an apnea. As a result, the RPT device 4000 delivers "backup breaths" in the absence of spontaneous respiratory effort from the patient 1000. For such forms, known as spontaneous/timed (ST) modes, the phase determination algorithm 4321 may make use of a "backup rate" Rb. The backup rate Rb is a setting of the RPT device 4000, and may be set for example by hard-coding during configuration of the RPT device 4000 or by manual entry through the input device 4220.

A phase determination algorithm 4321 (either discrete, or continuous) may implement ST modes using the backup rate Rb in a manner known as timed backup. Timed backup may be implemented as follows: the phase determination algorithm 4321 attempts to detect the start of inspiration due to spontaneous respiratory effort, for example by comparing the respiratory flow rate Qr with a trigger threshold as described above. If the start of spontaneous inspiration is not detected within an interval after the last trigger instant whose duration is equal to the reciprocal or inverse of the backup rate Rb (an interval referred to as the backup timing threshold, Tbackup), the phase determination algorithm 4321 sets the phase output Φ to value of 0, thereby triggering the RPT device 4000 to deliver a backup breath. The phase determination algorithm 4321 then attempts to detect the start of spontaneous expiration, for example by comparing the respiratory flow rate Qr with a cycle threshold as described above. The cycle threshold for backup breaths may be different from the cycle threshold for spontaneous breaths. As with spontaneous breaths, spontaneous cycling during backup breaths may be prevented during a "refractory period" of duration Timin after the last trigger instant.

As with spontaneous breaths, if during a backup breath the start of spontaneous expiration is not detected within Timax seconds after the last trigger instant, the phase determination algorithm 4321 sets the phase output Φ to value of 0.5, thereby cycling the RPT device 4000. The phase determination algorithm 4321 then attempts to detect the start of spontaneous inspiration by comparing the respiratory flow rate Qr with a trigger threshold as described above.

5.4.3.2.2 Waveform Determination

In one form of the present technology, the waveform determination algorithm 4322 provides an approximately constant treatment pressure throughout a respiratory cycle of a patient.

In other forms of the present technology, the waveform determination algorithm 4322 controls the pressure generator 4140 to provide a treatment pressure Pt that varies throughout a respiratory cycle of a patient according to a waveform template.

In one form of the present technology, a waveform determination algorithm 4322 provides a waveform template π(Φ) with values in the range [0, 1] on the domain of phase values Φ provided by the phase determination algorithm 4321 to be used by the waveform determination algorithm 4322.

In one form, suitable for either discrete or continuously-valued phase, the waveform template π(Φ) is a square-wave template, having a value of 1 for values of phase up to and including 0.5 revolutions, and a value of 0 for values of phase above 0.5 revolutions. In one form, suitable for continuously-valued phase, the waveform template π(Φ) comprises two smoothly curved portions, namely a smoothly curved (e.g. raised cosine) rise from 0 to 1 for values of phase up to 0.5 revolutions, and a smoothly curved (e.g. exponential) decay from 1 to 0 for values of phase above 0.5 revolutions.

In some forms of the present technology, the waveform determination algorithm 4322 selects a waveform template π(Φ) from a library of waveform templates, dependent on a setting of the RPT device 4000. Each waveform template π(Φ) in the library may be provided as a lookup table of values π against phase values Φ. In other forms, the waveform determination algorithm 4322 computes a waveform template π(Φ) "on the fly" using a predetermined functional form, possibly parametrised by one or more parameters (e.g. a rise time and a fall time). The parameters of the functional form may be predetermined or dependent on a current state of the patient 1000.

In some forms of the present technology, suitable for discrete bi-valued phase of either inspiration (Φ=0 revolutions) or expiration (Φ=0.5 revolutions), the waveform determination algorithm 4322 computes a waveform template π "on the fly" as a function of both discrete phase Φ and time t measured since the most recent trigger instant. In one such form, the waveform determination algorithm 4322 computes the waveform template π(Φ, t) in two portions (inspiratory and expiratory) as follows:

$$\prod(\Phi, t) = \begin{cases} \prod_i(t), & \Phi = 0 \\ \prod_e(t - Ti), & \Phi = 0.5 \end{cases}$$

where $\pi_i(t)$ and $\pi_e(t)$ are inspiratory and expiratory portions of the waveform template $\pi(\Phi, t)$.

In one such form, the inspiratory portion $\pi_i(t)$ of the waveform template is a smooth rise from 0 to 1 in two continuous sections:

a linear rise up to ⅔ for the first half of a parameter known as the "time scale";

a parabolic rise up to 1 for the second half of the time scale.

The "rise time" of such an inspiratory portion $\pi_i(t)$ may be defined as the time taken for $\pi_i(t)$ to rise to a value of 0.875.

The expiratory portion $\pi_e(t)$ of the waveform template is a smooth fall from 1 to 0 in two continuous parabolic sections, with an inflection point between 25% and 50% of the time scale. The "fall time" of such an expiratory portion $\pi_e(t)$ may be defined as the time taken for $\pi_e(t)$ to fall to a value of 0.125.

5.4.3.2.3 Ventilation Determination

In one form of the present technology, a ventilation determination algorithm 4323 receives an input a respiratory flow rate Qr, which may be derived from an estimated flow rate signal as previously described, and determines a measure Vent indicative of current patient ventilation.

In some implementations, the ventilation determination algorithm 4323 computes Vent as an "instantaneous ventilation" Vint, which is half the absolute value of the respiratory flow rate signal Qr.

In some implementations, the ventilation determination algorithm 4323 computes Vent as a "very fast ventilation" VveryFast by filtering the instantaneous ventilation Vint by a low-pass filter such as a fourth order Bessel low-pass filter with a corner frequency of approximately 0.10 Hz. This is equivalent to a time constant of approximately ten seconds.

In some implementations, the ventilation determination algorithm 4323 computes a Vent as a "fast ventilation" Vfast by filtering the instantaneous ventilation Vint by a low-pass filter such as a fourth order Bessel low-pass filter with a corner frequency of approximately 0.05 Hz. This is equivalent to a time constant of approximately twenty seconds.

In some implementations of the present technology, the ventilation determination algorithm 4323 determines Vent as a measure of alveolar ventilation. Alveolar ventilation is a measure of how much air is actually reaching the gas exchange surfaces of the respiratory system in a given time. Because the respiratory system of the patient includes a significant "anatomical dead space", i.e. volume in which gas exchange does not take place, the alveolar ventilation is less than the "gross" ventilation values that the above calculations that operate directly on the respiratory flow rate Qr will produce, but is a more accurate measure of the respiratory performance of a patient.

In such implementations, the ventilation determination algorithm 4323 may determine the instantaneous alveolar ventilation to be either zero or half the absolute value of the respiratory flow rate Qr. The conditions under which the instantaneous alveolar ventilation is zero are:

When the respiratory flow rate changes from non-negative to negative, or

When the respiratory flow rate changes from negative to non-negative, and

After the respiratory flow rate has changed sign, for the period during which the absolute value of the integral of the respiratory flow rate Qr is less than the patient's anatomical dead space volume.

The patient's anatomical dead space volume may be a setting of the RPT device 4000, set for example by hard-coding during configuration of the RPT device 4000 or by manual entry through the input device 4220.

In some such implementations, the ventilation determination algorithm 4323 may compute Vent as a "very fast alveolar ventilation" and/or a "fast alveolar ventilation" by low-pass filtering the instantaneous alveolar ventilation using the respective low-pass filters described above.

In what follows the word "alveolar" is omitted but it may be assumed to be present in some implementations of the therapy engine module 4320. That is, mentions of "ventilation" and "tidal volume" in the subsequent description may be taken to apply to alveolar ventilation and alveolar tidal volume as well as "gross" ventilation and tidal volume.

5.4.3.2.4 Inspiratory Flow Limitation Determination

In one form of the present technology, the therapy engine module 4320 executes one or more algorithms to determine the extent of flow limitation, sometimes referred to as partial upper airway obstruction, in the inspiratory portion of the respiratory flow rate waveform (herein sometimes shortened to the "inspiratory waveform"). In one form, the flow limitation determination algorithm 4324 receives as an input a respiratory flow rate signal Qr, which may be derived from an estimated flow rate signal as previously described, and provides as an output a measure of the extent to which each inspiratory waveform exhibits flow limitation.

A normal inspiratory waveform is rounded, close to sinusoidal in shape (see FIG. 6A). With sufficient upper airway muscle tone (or EPAP), the airway acts essentially as a rigid tube, where flow increases in response to increased breathing effort (or external ventilatory assistance). In some situations (e.g. sleep, sedation) the upper airway may be collapsible, such as in response to sub-atmospheric pressure within it from breathing effort, or even from applied ventilation. This can lead to either full obstruction (apneas), or a phenomenon known as 'flow limitation'. The term 'flow limitation' includes behaviour where increased breathing effort simply induces increased narrowing of the airway, such that inspiratory flow becomes limited at a constant value, independent of effort ("Starling resistor behaviour"). Therefore, the inspiratory flow rate curve exhibits a flattened shape (see FIG. 6B).

In reality, upper airway behaviour is even more complicated, and there is a wide variety of flow shapes that are indicative of upper airway-related inspiratory flow limitation, and an even wider variety in the presence of external ventilatory assistance (see FIGS. 6C to 6F). For this reason, the flow limitation determination algorithm 4324 may respond to one or more of the following kinds of inspiratory flow limitation: "classical flatness" (see FIG. 6B), "chairness" (see FIG. 6C), and "reverse chairness" (see FIG. 6D). ("M-shape" (see FIGS. 6E and 6F) is dealt with separately, using M-shape detection algorithm 4326.)

5.4.3.2.5 M-Shape Detection

In one form of the present technology, the therapy engine 4320 module executes one or more algorithms to detect "M-shape" in the inspiratory waveform. In one form, the M-shape detection algorithm 4326 receives as an input a respiratory flow rate signal Qr and provides as an output a measure indicative of the extent to which each inspiratory waveform exhibits M-shape.

M-shaped inspiratory waveforms with tidal volumes or other breathwise ventilation values not much greater than typical recent values are indicative of flow limitation. Such inspiratory waveforms have a relatively rapid rise and fall and a dip or "notch" in flow approximately in the centre, the dip being due to flow limitation (see FIGS. 6E and 6F). At higher tidal volumes or breathwise ventilation values, such waveforms are generally behavioural, i.e. micro-arousals during sleep, or sighs, and are not indicative of flow limitation.

To detect M-shaped waveforms, the M-shape detection algorithm 4326 determines the similarity of the inspiratory waveform to a waveform which is broadly M-shaped.

5.4.3.2.6 Apnea Detection

In one form of the present technology, the therapy engine module 4320 executes an apnea detection algorithm 4325 to detect apneas.

In one form, the apnea detection algorithm 4325 receives as an input a respiratory flow rate signal Qr and provides as an output a series of events indicating starts and ends of detected apneas.

5.4.3.2.7 Typical Recent Ventilation Determination

In one form of the present technology, the central controller 4230 takes as input the measure of current ventilation, Vent, and executes one or more typical recent ventilation determination algorithms 4328 for the determination of a value Vtyp indicative of the typical recent ventilation of the patient 1000.

The typical recent ventilation Vtyp is the value around which the distribution of the measure of current ventilation Vent over multiple time instants over some predetermined timescale tends to cluster, that is, a measure of the central tendency of the measure of current ventilation over recent history. In one implementation of the typical recent ventilation determination algorithm 4328, the recent history is of the order of several minutes, but in any case should be longer than the timescale of Cheyne-Stokes waxing and waning cycles. The typical recent ventilation determination algorithm 4328 may use any of the variety of well-known measures of central tendency to determine the typical recent ventilation Vtyp from the measure of current ventilation, Vent. One such measure is the output of a low-pass filter on the measure of current ventilation Vent, with time constant equal to one hundred seconds.

5.4.3.2.8 Airway Patency Determination

In one form of the present technology, the central controller 4230 executes an airway patency determination algorithm 4327 for the determination of airway patency. In some implementations, the airway patency determination algorithm 4327 returns either "closed" or "open", or equivalent Boolean values, e.g. "true" indicating closed and "false" indicating open.

5.4.3.2.9 Determination of Therapy Parameters

In some forms of the present technology, the central controller 4230 executes one or more therapy parameter determination algorithms 4329 for the determination of one or more therapy parameters using the values returned by one or more of the other algorithms in the therapy engine module 4320.

In one form of the present technology, the therapy parameter is an instantaneous treatment pressure Pt. In one implementation of this form, the therapy parameter determination algorithm 4329 determines the treatment pressure Pt as follows:

$$Pt = A\pi(\Phi, t) + P_0 \quad (1)$$

where A is the amount of "pressure support", $\pi(\Phi, t)$ is the waveform template value (in the range 0 to 1) at the current values $\Phi$ of phase and t of time, and $P_0$ is a base pressure.

By determining the treatment pressure Pt using equation (1) and applying it as a set point in the controller 4230 of the RPT device 4000, the therapy parameter determination algorithm 4329 oscillates the treatment pressure Pt in synchrony with the spontaneous respiratory effort of the patient 1000. That is, based on the typical waveform templates $\pi(\Phi)$ described above, the therapy parameter determination algorithm 4329 increases the treatment pressure Pt at the start of, or during, or inspiration and decreases the treatment pressure Pt at the start of, or during, expiration. The (non-negative) pressure support A is the amplitude of the oscillation.

If the waveform determination algorithm 4322 provides the waveform template $\pi(\Phi)$ as a lookup table, the therapy parameter determination algorithm 4329 applies equation (1) by locating the nearest lookup table entry to the current value $\Phi$ of phase returned by the phase determination algorithm 4321, or by interpolation between the two entries straddling the current value $\Phi$ of phase.

The values of the pressure support A and the base pressure $P_0$ may be determined by the therapy parameter determination algorithm 4329 depending on the chosen respiratory pressure therapy mode in the manner described below.

5.4.3.3 Therapy Control Module

Therapy control module 4330 in accordance with one aspect of the present technology receives as inputs the therapy parameters from the therapy parameter determination algorithm 4329 of the therapy engine module 4320, and controls the pressure generator 4140 to deliver a flow of air in accordance with the therapy parameters.

In one form of the present technology, the therapy parameter is a treatment pressure Pt, and the therapy control module 4330 controls the pressure generator 4140 to deliver a flow of air whose mask pressure Pm at the patient interface 3000 is equal to the treatment pressure Pt or whose interface flow rate $F_t$ at the interface is equal to a treatment flow $TF_t$

5.4.3.4 Detection of Fault Conditions

In one form of the present technology, the central controller 4230 executes one or more methods for the detection of fault conditions. The fault conditions detected by the one or more methods may include at least one of the following:
- Power failure (no power, or insufficient power)
- Transducer fault detection
- Failure to detect the presence of a component
- Operating parameters outside recommended ranges (e.g. pressure, flow rate, temperature, $PaO_2$)
- Failure of a test alarm to generate a detectable alarm signal.
- Significant inequality of flow rate signal from flow sensor and flow rate estimate signal from flow rate signal estimation 4137 process Upon detection of the fault condition, the corresponding algorithm signals the presence of the fault by one or more of the following:

Initiation of an audible, visual &/or kinetic (e.g. vibrating) alarm

Sending a message to an external device

Logging of the incident change of control parameters as described in more detail herein

5.5 Humidifier

In one form of the present technology there is provided a humidifier 5000 (e.g. as shown in FIG. 5A) to change the absolute humidity of air or gas for delivery to a patient relative to ambient air. Typically, the humidifier 5000 is used to increase the absolute humidity and increase the temperature of the flow of air (relative to ambient air) before delivery to the patient's airways.

The humidifier 5000 may comprise a humidifier reservoir 5110 with surface portion 5150, a humidifier inlet 5002 to receive a flow of air, and a humidifier outlet 5004 to deliver a humidified flow of air. In some forms, as shown in FIG. 5A and FIG. 5B, an inlet and an outlet of the humidifier reservoir 5110 may be the humidifier inlet 5002 and the humidifier outlet 5004 respectively. The humidifier 5000 may further comprise a humidifier base 5006 with base portion 5135, which may be adapted to receive the humidifier reservoir 5110 at bottom portion 5120, and comprise a heating element 5240.

5.6 Respiratory Pressure Therapy Modes

Various respiratory pressure therapy modes may be implemented by the RPT device 4000 depending on the values of the parameters A and $P_0$ in the treatment pressure equation (1) used by the therapy parameter determination algorithm 4329 in one form of the present technology.

5.6.1 CPAP Therapy

In some implementations, the pressure support A is identically zero, so the treatment pressure Pt is identically equal to the base pressure $P_0$ throughout the respiratory cycle. Such implementations are generally grouped under the heading of CPAP therapy. In such implementations, there is no need for the therapy engine module 4320 to determine phase $\Phi$ or the waveform template $\pi(\Phi)$.

5.6.2 Ventilation Therapy

In other implementations, the value of pressure support A in equation (1) may be positive. Such implementations are known as ventilation therapy. In some forms of ventilation therapy, known as fixed pressure support ventilation therapy, the pressure support A is fixed at a predetermined value, e.g. 10 cmH$_2$O. The predetermined value of pressure support A is a setting of the RPT device 4000, and may be set for example by hard-coding during configuration of the RPT device 4000 or by manual entry through the input device 4220. In some versions, the pressure may be bi-level such as where a higher pressure is delivered during patient inspiration and a lower pressure is delivered during patient expiration The value of the pressure support A may be limited to a range defined as [Amin, Amax]. The pressure support limits Amin and Amax are settings of the RPT device 4000, set for example by hard-coding during configuration of the RPT device 4000 or by manual entry through the input device 4220. A minimum pressure support Amin of 3 cmH$_2$O is of the order of 50% of the pressure support required to perform all the work of breathing of a typical patient in the steady state. A maximum pressure support Amax of 12 cmH$_2$O is approximately double the pressure support required to perform all the work of breathing of a typical patient, and therefore sufficient to support the patient's breathing if they cease making any efforts, but less than a value that would be uncomfortable or dangerous.

5.7 Respiratory Flow Therapy Modes

In some versions, the RPT may be configured with a flow control loop, such as with an estimate flow signal, to provide respiratory therapies with an interface to the patient's airways that is 'open' (unsealed). The respiratory therapy may supplement the patient's own spontaneous breathing with a controlled flow of conditioned or enriched gas. In one example, High Flow therapy (HFT) in controlled an entrance to the airway through an unsealed or open patient interface at a "treatment flow rate" that is held approximately constant throughout the respiratory cycle. The treatment flow rate is nominally set to exceed the patient's peak inspiratory flow rate. As an alternative to constant flow rate, the treatment flow rate may follow a profile that varies over the respiratory cycle.

5.8 Flow Rate Signal Estimation

Figure 1:
Figure 2:
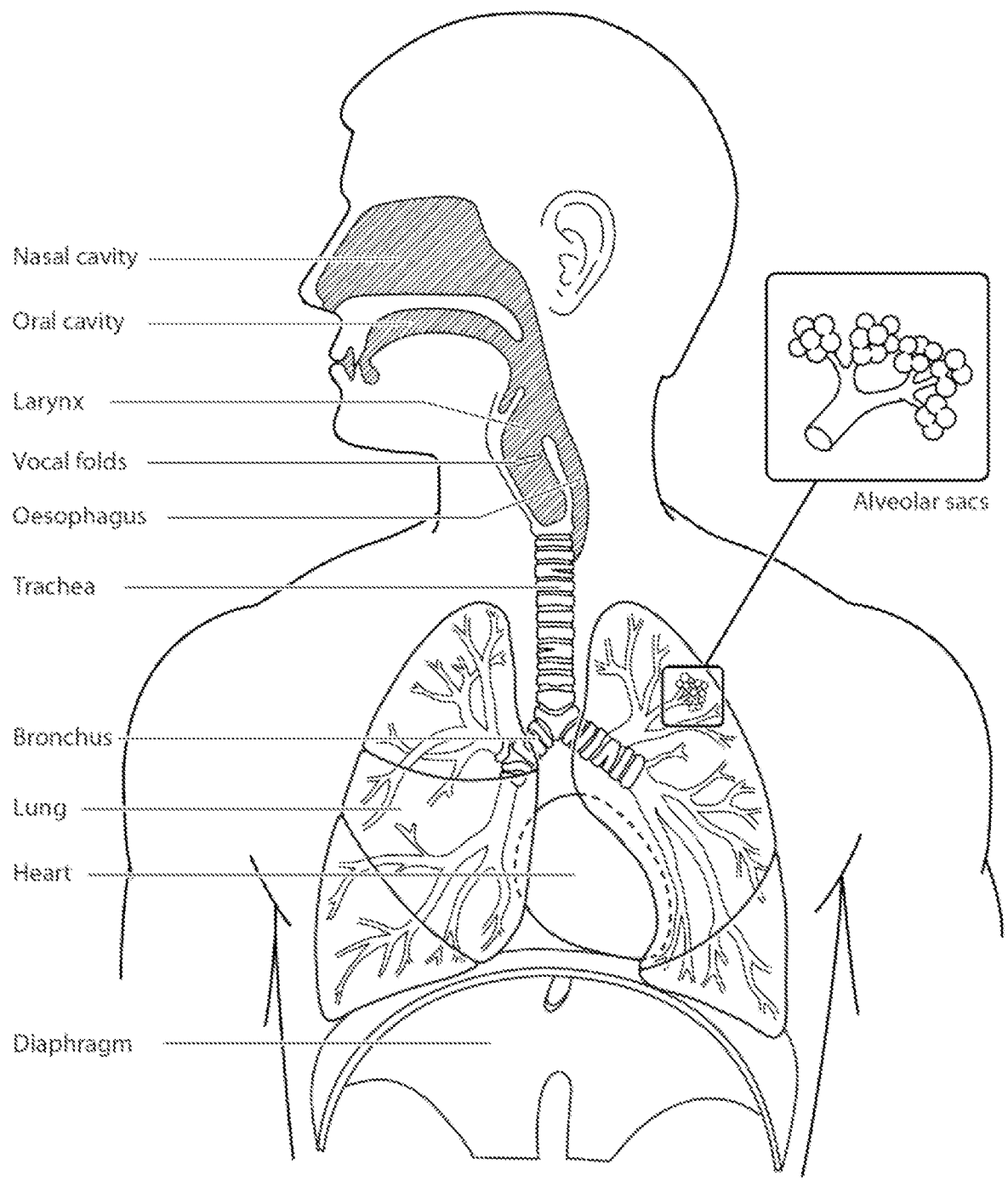
Figure 3:
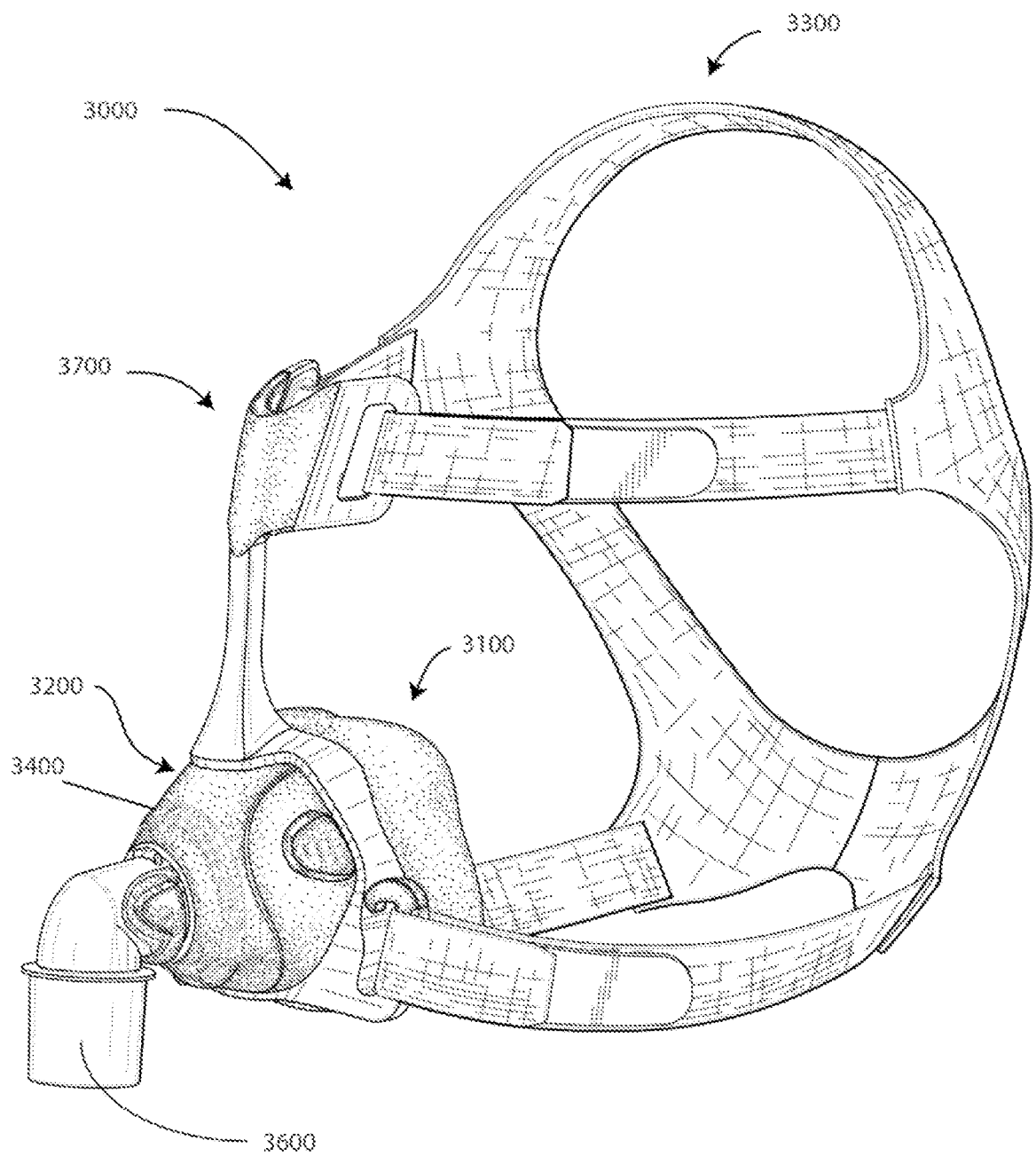
Figure 4A:
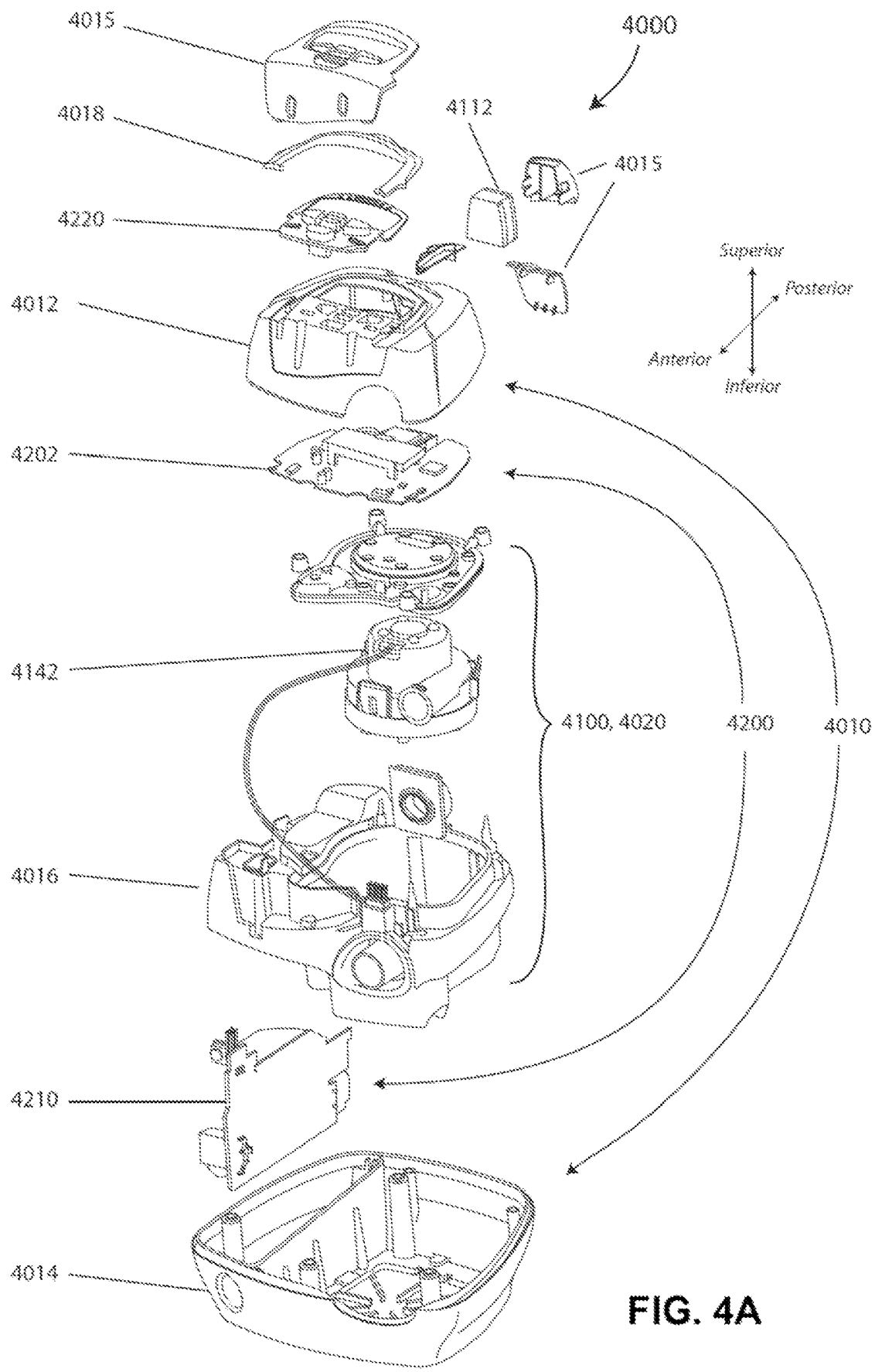
FIG. 4A shows an RPT device in accordance with one form of the present technology.
Figure 4B:
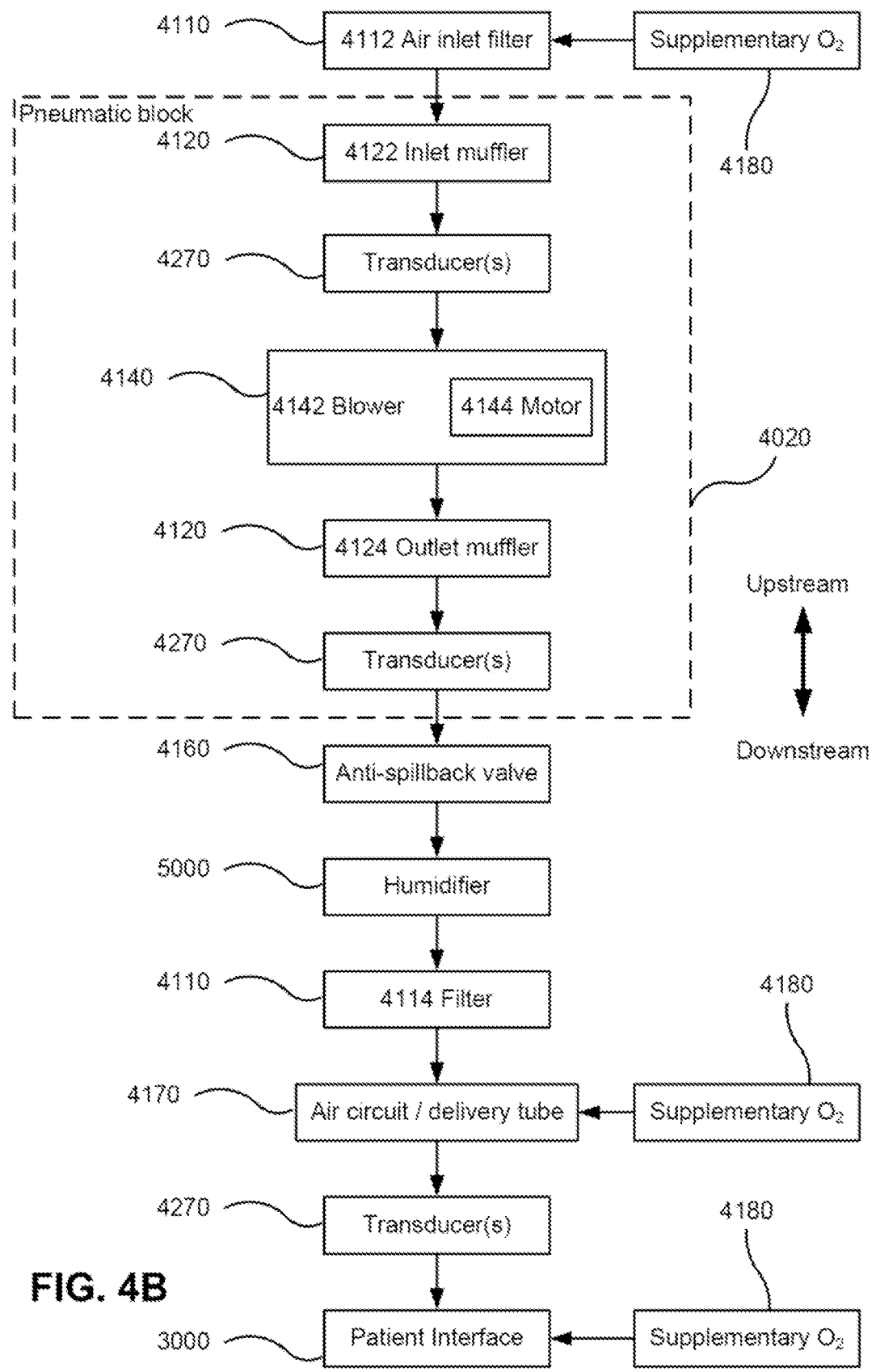
FIG. 4B is a schematic diagram of the pneumatic path of an RPT device in accordance with one form of the present technology. The directions of upstream and downstream are indicated.
Figure 4C:
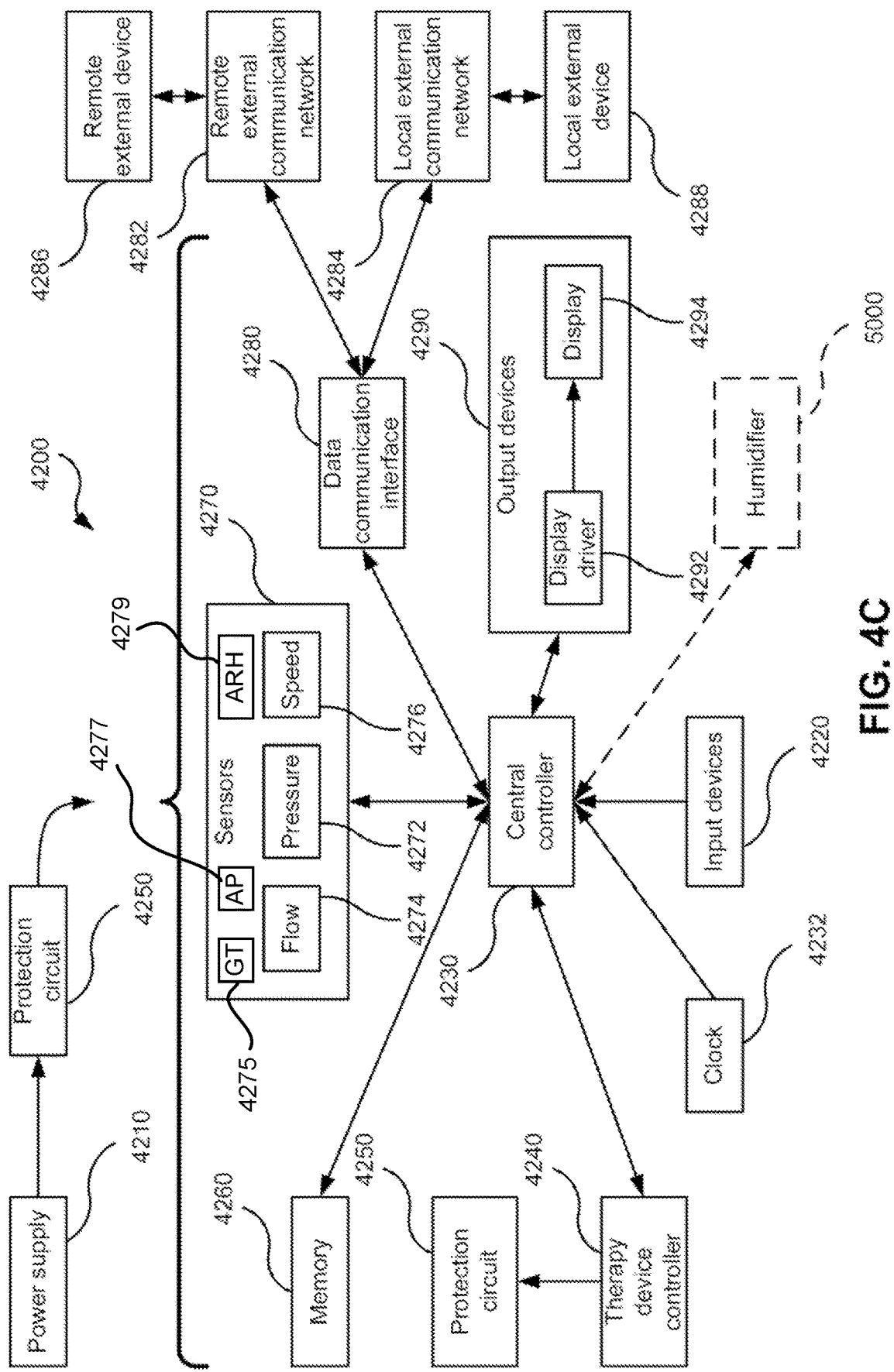
FIG. 4C is a schematic diagram of the electrical components of an RPT device in accordance with one form of the present technology.
Figure 4D:
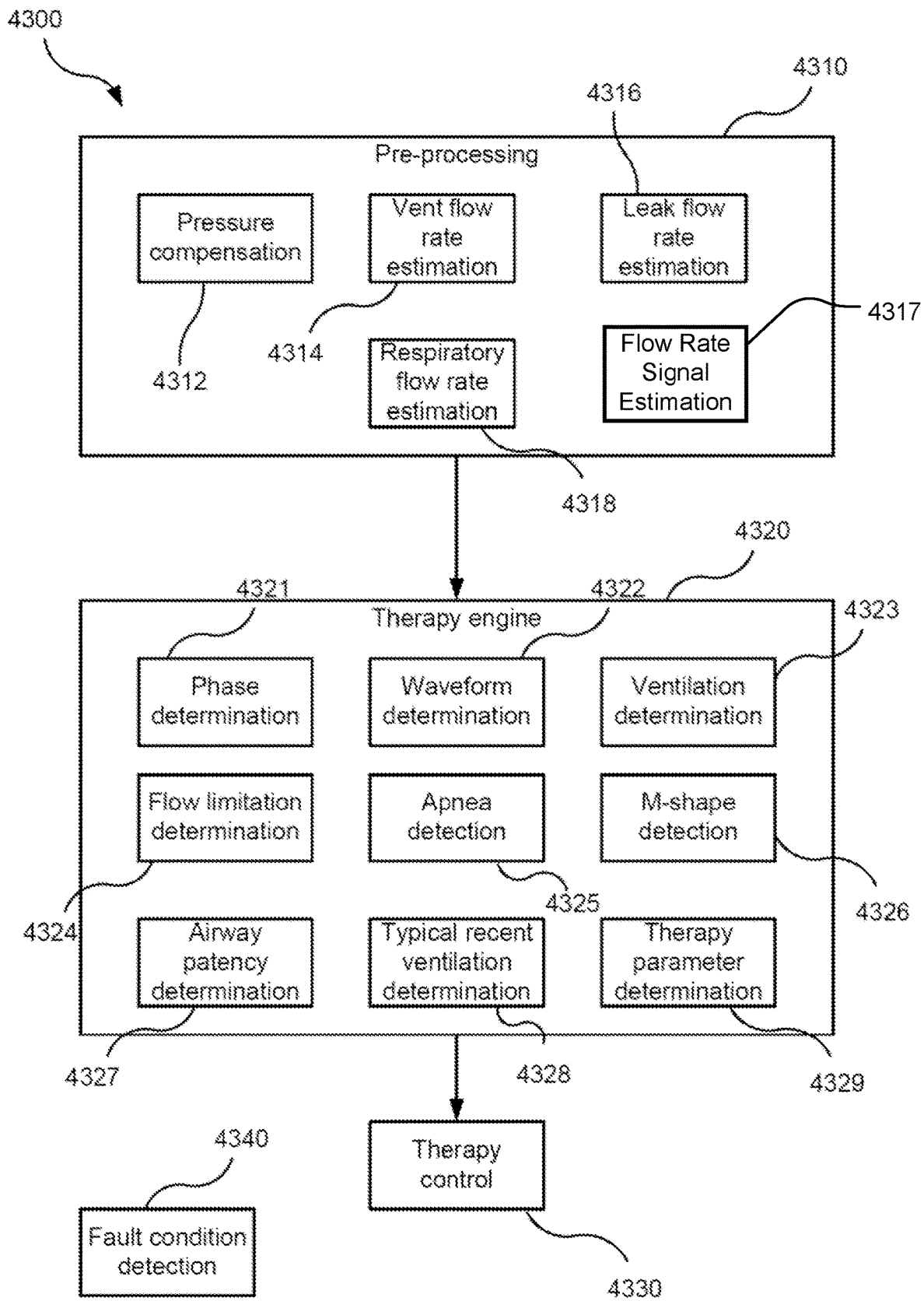
FIG. 4D is a schematic diagram of the algorithms implemented in an RPT device in accordance with one form of the present technology.

As previously mentioned, a controller or processor such as one or more of an RPT may implement flow rate signal estimation, such as without utilizing a signal from a flow rate sensor, by implementing a flow rate signal estimation 4317 process of FIG. 4D. One such example flow estimation process is illustrated in the estimation process 7002 of FIG. 7. As illustrated, the process may involve a flow estimation unit 7004, such as of the central controller or processor using control logic or processor control instructions as previously described, implementing function(s) including a flow estimate function to derive a flow rate estimate signal 7008 from a set of input signals 7010 that may include measurements from a set of sensors. In the example, the flow rate estimate unit 7004 may receive signals (e.g., access data values from memory and/or more directly from sensors) to generate the flow rate estimate signal 7008. As illustrated, the input signals may include pressure 7012 such as from a pressure sensor 4272 in the pneumatic path of an RPT so as to be associated with the operation of a blower. The input signals may include motor speed 7014 such as from the speed sensor 4276 that may be associated with the motor of the blower of the RPT. The input signals may include atmospheric pressure 7016 such as from the atmospheric pressure sensor 4277 that may be configured to measure ambient pressure. The input signals may include gas temperature 7018 such as from the gas temperature sensor 4275 that may be associated with the gas within the pneumatic path of the RPT. The input signals may include ambient relative humidity 7020 such as from the ambient relative humidity sensor 4279 that may be associated with the gas outside the pneumatic path (e.g., ambient) of the RPT. In some versions, the input signals may also optionally include signal(s) from an oxygen sensor (e.g., oxygen concentration 7021) and/or from a motor parameter sensors(s) (e.g., motor parameters 7023). The input signals may be received from the sensors in real or near real time for a contemporaneous generation of the flow rate estimation signal repeatedly over time. Moreover, in some versions such an estimation signal process may utilize one, more or all of such signals from stored values of a memory.

In some examples, the flow rate estimation unit 7004 may implement one or more of the processes illustrated in the flow charts of FIGS. 8A and 8B. Moreover, the flow rate estimation unit 7004 may operate with the therapy engine and/or the fault condition detection 4340 process to implement the methodologies illustrated in FIG. 8C. For example, as illustrated in FIG. 8A, at step or process 8002, the flow rate estimation unit 7004 may receive input signals, such as the measured atmospheric pressure signal and the measured motor speed signal, such as using one or more sensors and optionally other input signals previously described. At step or process 8004, the flow rate estimation unit 7004 may compute an entrained air density function. At step or process 8006, the flow rate estimation unit 7004 may generate a flow rate estimate signal 7008, such as with a flow estimation function that uses the gas pressure, the motor speed and the entrained air density function. Optionally, such as in relation to the processes of the therapy engine, the fault condition detection engine in conjunction with the flow estimation unit, the central controller at process or step 8008 may generate an output indicator based on the generated flow rate estimate signal and/or assessment of the estimated signal. In some versions, flow rate estimation may alternatively be derived with the other motor parameters (e.g., motor power) to generate an estimated flow signal such as described in U.S. Pat. No. 6,237,593 to Brydon (ResMed Limited). Such an estimated flow signal may be utilized such as when the flow rate of the system is negative (e.g., moving in one direction toward a flow generator blower from a patient interface such as from a patient).

In some versions, oxygen concentration, such as with the signal from an oxygen sensor, may be evaluated in determining an estimated flow rate such as to consider the concentration of the breathable gas that is being sensed. For example, if the gas composition of the breathable gas of the system is different or significantly different from ambient air, the function(s) for generation of the estimated flow signal may be modified to account for the difference, or use of the existing functions aborted, since the gas may be other than what is expected (e.g., the gas is different from ambient air used in model to derive the entrained air density function). In some examples, multiple entrained air density functions as described by the empirically model herein may be derived at design time where each uses a different concentration of gas. Thus, in some versions, the signal from oxygen sensor may serve to select a suitable entrained air density function from the multiple functions according to a concentration of gas measured at run time by the oxygen sensor such that the chosen function(s) was(were) previously empirically derived (e.g., using fan curves) with a similar or equivalent concentration of gas.

Thus, in some versions, implementation of the flow rate estimation function, such as for when flow rate of the system is positive (e.g., moving in one direction from a flow generator blower to a patient interface such as to a patient and a vent of the patient interface) may be computed according to the following equations/function, which is a function of pressure, speed and atmospheric density:

$$\text{Flow\_est} = \frac{-B - \sqrt{B^2 - 4A(C - \text{Pressure\_meas})}}{2A}$$

Where:
Flow_est is the generated flow estimate signal;
A, B and C are each a frequency related function of a set of functions such as of at least rotational frequency (e.g., measured motor speed); and
Pressure_meas is a measure of a pressure produced by the blower such as taken with the pressure sensor 4272 within a pneumatic path of the RPT.

In one such example, the set of functions of rotational frequency may be implemented as follows:

$$A = (r1 * RPM - r2) * \frac{\rho_{ref}}{\rho_{local}}$$

$$B = -r3 * RPM^2 - r4 * RPM - r5$$

$$C = (r6 * RPM^2 - r7 * RPM + r8) * \frac{\rho_{local}}{\rho_{ref}}$$

where:
r1, r2, r3, r4, r5, r6 and r7 are constants;
RPM is the measured motor speed (e.g., rotations per minute); and $$\frac{\rho_{local}}{\rho_{ref}} \text{ and } \frac{\rho_{ref}}{\rho_{local}}$$

are entrained air density functions or may be derived with such a function. They may include a ratio of a reference atmospheric density and local atmospheric density, and may be computed as described in more detail herein in relation to the example process of FIG. 8B. Each such ratio, as implemented in the generation of the flow rate estimate signal, may be considered a density correction factor. The reference atmospheric density may be the atmospheric density that existed when the fan curves needed to build the model had been recorded. The density correction factor, and in particular its local atmospheric density, may be empirically determined by evaluation of one or more fan curves such as at the same speed but various altitudes as described in more detail herein, such as with a particular oxygen concentration of gas (e.g., ambient air or other).

In the example implementation, the constants of the rotational frequency related functions (A, B, C) may be empirically determined with fan curve(s) at different altitudes and associated with operation of a blower of an RPT (e.g., using at least in part pressure, flow rate and RPM measurements) and polynomial modelling (e.g., using $2^{nd}$ order polynomial equations). For example, the values may be found empirically by comparing the fan curves (e.g., at 5000, 10000, 15000 and 20000 RPM) at sea level, 2000 m and 3000 m altitudes such as using a barometric chamber. In one such example, such constants may respectively be the following values: 0.00000001, 0.00086500, 0.00000000005, 0.0000005119, 0.0130975, 0.000000038, 0.000070756 and 0.281905000. However, it will be understood that such values of the constants can be different values which will depend on the type and construction of the blower of the RPT device. Moreover, the values for these constants may, for example, be approximated or otherwise rounded to a suitable number of digits as desired by any particular implementation.

As previously mentioned, the aforementioned flow rate estimation unit 7004 employs an entrained air density function that may relate a reference atmospheric density value and a local determined atmospheric density value. Such a function may use measured signals, such as data from a memory representing such signals, from a set of sensors including, for example, the gas temperature sensor 4275, the atmospheric pressure sensor 4277 and the relative humidity sensor.

An example process to implement such a function of process or step 8004 of FIG. 8A is illustrated in FIG. 8B. At process or step 8022, the central controller or a processor may receive signals representing gas temperature, atmospheric pressure and the relative humidity. At process or step 8024, the central controller or a processor may compute a saturated vapour pressure function (Psv), such as in relation to temperature, which may use the measured temperature. At process or step 8026, the central controller or a processor may compute a vapour pressure function (Pv), such as in relation to temperature and relative humidity, which may use the measured relative humidity. Such a function may employ the saturated vapour pressure function (Psv) so that the vapour pressure function (Pv) is also a function of temperature. At process or step 8026, the central controller or a processor may compute an atmospheric density value based on the vapour pressure function (Pv), saturated vapour pressure function (Psv) and an atmospheric pressure signal.

For example, in some versions, the saturated vapour pressure function (Psv) may be implemented as follows:
where:

$$Psv = K1 * e^{K2 * \left( \frac{Temp_{local_{DegC}}}{Temp_{local_{DegC}} + K3} \right)}$$

Psv is a value of saturated vapour pressure produced by the saturated vapour pressure function;
e is Euler's number or other value approximating such a number to a desired number of digits;
$Temp_{local\_DegC}$ is the measured temperature such as in degrees Celsius or other suitable temperature metric; and
K1, K2, and K3 are constants that may be determined empirically, but in some versions may be, for example, 6.1078, 17.2693882, and 237.4 respectively. These values may, for example, be approximated or otherwise rounded to a suitable number of digits as desired by any particular implementation.

In some versions, the vapour pressure function (Pv) may be implemented as follows:

$Pv = RH_{local} * Psv$ where:
Pv is a value of vapour pressure produced by the vapour pressure function;
$RH_{local}$ is the measured relative humidity such as from the signal from the ambient relative humidity sensor 4279, which may be a percentage; and
Psv is a value of saturated vapour pressure produced by the saturated vapour pressure function.

In computing a local atmospheric density value in some versions, the entrained air density function, which is a function of atmospheric pressure, gas temperature and relative humidity, may be implemented as follows:

$$\rho_{local} = \rho_0 \cdot \left( \frac{Patm_{local} - Z1 * Pv}{P_0} \right) \cdot \frac{T_0}{Temp_{local\_DegK}}$$

where:
$\rho_{local}$ is a local atmospheric density value such as for use in computing of the aforementioned ratio;
$P_0$ is 1013.0 hecto Pascals;
$T_0$ is 15.0 degrees Celsius or 288.15 degrees Kelvin;
$\rho_0$ is $$1.2256 \; \frac{kg}{m^3};$$

$P_{atm\_local}$ is a measure of atmospheric pressure such as from a signal generated by the atmospheric pressure sensor 4277;
Z1 is a constant which may empirically determined, and in some versions may be, for example, 0.3783 or other approximate value thereof such as rounded to a desired number of digits as desired by any particular implementation;
$Temp_{local\_DegK}$ is the measured temperature such as in degrees Kelvin or other suitable temperature metric; and
Pv is a value of vapour pressure produced by the vapour pressure function.

Such a generated flow rate estimate signal may be implemented by a controller (e.g., central controller) or processor, such as of an RPT device, to perform various operations such as for device diagnostics (e.g., fault detection). Additionally, the estimate signal may be generated for control and/or respiratory condition detection in lieu of, or in addition to, an assessment of a flow signal generated by a flow sensor. Examples of such automated operations may be considered in relation to the step or process 8008 as previously mentioned in relation to FIG. 8A and also illustrated in more detail of the example of FIG. 8C.

For example, at step or process 8030, the controller or processor, may optionally receive a measured flow rate signal from a flow sensor 4274. At step or process 8031, the controller or processor, may receive the flow rate estimate signal 7008 from a flow rate estimation process 7002. At step or process 8032, the controller or processor, may evaluate the flow rate estimate signal 7008. For example, in some versions, such an evaluation may involve any of the methods described herein or otherwise known in relation to an analysis of a flow rate signal from a flow sensor but instead using the flow rate estimate signal. For example, the estimate signal may be evaluated to determine a start of patient inspiration such as for trigging an IPAP, the start of patient expiration for cycling an EPAP, or for determining a phase variable as described herein. In some versions, the flow rate estimate signal may be evaluated in relation to the measured flow rate signal. For example, the flow rate estimate signal may be utilized as a diagnostic check on the measured flow rate signal. For example, the controller or processor may compare the two signals and based on the comparison generate an indicator such as an error, fault or lack of fault indicator. In one such version, if a difference or multiple differences from different times along the signal is/are significant, such as in relation to one or more thresholds, the controller or processor may generate a fault signal. A lack of a significant difference may serve as a confirmation that no fault exists with the flow sensor and a suitable signal may be generated such as to permit operations that rely on the flow sensor as an input signal to any of the methodologies/processes as previously described.

Optionally, output from the process 8034, such as an error signal or fault signal, may be applied in the control of the respiratory apparatus, such as the RPT device at step or process 8036, such as to change operations, stop operations, trigger warnings or alarms (e.g., audible, visual or communicated messages) of the error. In some such examples, such an output may be reported on a diagnostic display such as to show the error of fault of the flow sensor or depict the relationship between the estimated signal and the measured signal. A display example of a comparison may be considered in relation to the graph of FIGS. 9 and 10. By way of further example, with the indication of a fault with the flow sensor, a mode of operation of the RPT may change such that it may refrain from relying on a flow rate signal. In some such control versions, such an activated flow rate estimate mode of operation of the RPT may process the flow rate estimate signal instead of the measured flow rate signal. In some such versions, the controller may determine ventilation control parameters such as a measure of patient ventilation (e.g., tidal volume, minute ventilation, etc.) for achieving a controlled ventilation target for adjustment of a pressure support. By way of further example, breathing rate and respiratory flow may be determined from the estimate signal. Additionally, pressure and/or flow control parameters, such as for a pressure or flow control loop of a controller of the RPT, may be modified based upon the flow rate estimate signal. In some such versions, a detected difference between the estimate signal and the measure flow rate signal may be applied as an error signal to calibrate the flow sensor. For example, such a difference or error may be applied to adjust a measure from the flow rate sensor so that the calibrated/adjusted measured flow rate signal may be utilized in any of the control processes of the controller of the RPT as described throughout this specification. Such a calibration process may be performed periodically by the device during a therapy session and/or in an initialization process when the RPT is activated before a use session.

Other operations by the controller or processor using the flow rate estimate signal may also be implemented. It could be applied as a substitute to using a flow sensor signal and all other metrics or features that otherwise might use a flow sensor signals as an input. For example, a conductance-based circuit disconnection alarm may be implemented with such a flow estimate signal rather than using a flow sensor signal. Thus, the conductance that serves as the basis for the detection of the disconnect condition may be calculated from measured pressure signal and the estimated flow rate signal (e.g., a ratio of values of such signals.) Furthermore, in some versions, the flow estimation signal may be used in a flow control loop with a target flow rate (e.g., treatment flow rate) such as in an RPT configured as a high flow therapy device. As such, it may either serve as a substitute for providing a flow sensor (i.e., a flow sensor may be omitted) or as a back-up in event of failure of an included a flow sensor.

The accuracy of such a flow rate estimate signal according to the aforementioned methodologies may be considered with its comparison to a measured flow rate signal in the graphs of FIGS. 9 and 10. In FIGS. 9A and 9B, fan curves that plot measured flow and estimated flow with respect to speed of a blower of an RPT are presented at different altitudes. FIG. 9A shows the data with the device operating at an altitude of 2000 meters. FIG. 9B shows the data with the device operating at an altitude of 3000 meters. As illustrated, the estimated flow curve closely approximates the measured flow curve over the range of speeds of the fan curve of the RPT's blower.

A similar evaluation utilizing the RPT during use (with a simulated breather) may be considered in relation to FIG. 10. In FIGS. 10A and 10B, gas flow of the RPT device include a respiratory component (rather than a fan curve). The graphs plot measured flow and estimated flow with respect to speed changes of a blower of an RPT device during respiratory related operations at different altitudes. FIG. 10A shows the data with the device operating at an altitude of 2000 meters. FIG. 10B shows the data with the device operating at an altitude of 3000 meters. As illustrated, the estimated flow curve still closely approximates the measured flow as the RPT's devices blower adjusts in response to the respiratory effort of a simulated user.

5.9 Glossary

For the purposes of the present technology disclosure, in certain forms of the present technology, one or more of the following definitions may apply. In other forms of the present technology, alternative definitions may apply.

5.9.1 General

Air: In certain forms of the present technology, air may be taken to mean atmospheric air, and in other forms of the present technology air may be taken to mean some other combination of breathable gases, e.g. atmospheric air enriched with oxygen.

Ambient: In certain forms of the present technology, the term ambient will be taken to mean (i) external of the treatment system or patient, and (ii) immediately surrounding the treatment system or patient or outside of the pneumatic path of the RPT device.

For example, ambient humidity with respect to a humidifier may be the humidity of air immediately surrounding the humidifier, e.g. the humidity in the room where a patient is sleeping. Such ambient humidity may be different to the humidity outside the room where a patient is sleeping.

In another example, ambient pressure may be the pressure immediately surrounding or external to the body.

In certain forms, ambient (e.g., acoustic) noise may be considered to be the background noise level in the room where a patient is located, other than for example, noise generated by an RPT device or emanating from a mask or patient interface. Ambient noise may be generated by sources outside the room.

Respiratory Pressure Therapy (RPT): The application of a supply of air to an entrance to the airways at a treatment pressure that is typically positive with respect to atmosphere.

Continuous Positive Airway Pressure (CPAP) therapy: Respiratory pressure therapy in which the treatment pressure is approximately constant through a respiratory cycle of a patient. In some forms, the pressure at the entrance to the airways will be slightly higher during expiration, and slightly lower during inspiration. In some forms, the pressure will vary between different respiratory cycles of the patient, for example, being increased in response to detection of indications of partial upper airway obstruction, and decreased in the absence of indications of partial upper airway obstruction.

Patient: A person, whether or not they are suffering from a respiratory disorder.

Automatic Positive Airway Pressure (APAP) therapy: CPAP therapy in which the treatment pressure is automatically adjustable, e.g. from breath to breath, between minimum and maximum limits, depending on the presence or absence of indications of SDB events.

5.9.2 Aspects of the Respiratory Cycle

Apnea: According to some definitions, an apnea is said to have occurred when flow falls below a predetermined threshold for a duration, e.g. 10 seconds. A closed apnea will be said to have occurred when, despite patient effort, some obstruction of the airway does not allow air to flow. An open apnea will be said to have occurred when an apnea is detected that is due to a reduction in breathing effort, or the absence of breathing effort, despite the airway being open (patent). A mixed apnea occurs when a reduction or absence of breathing effort coincides with an obstructed airway.

Breathing rate: The rate of spontaneous respiration of a patient, usually measured in breaths per minute.

Duty cycle, or inspiratory fraction: The ratio of inspiratory time, Ti, to total breath time, Ttot.

Effort (breathing): Breathing effort will be said to be the work done by a spontaneously breathing person attempting to breathe.

Expiratory portion of a breathing cycle: The period from the start of expiratory flow to the start of inspiratory flow.

Flow limitation: Flow limitation will be taken to be the state of affairs in a patient's respiration where an increase in effort by the patient does not give rise to a corresponding increase in flow. Where flow limitation occurs during an inspiratory portion of a breathing cycle it may be described as inspiratory flow limitation. Where flow limitation occurs during an expiratory portion of the breathing cycle it may be described as expiratory flow limitation.

Types of flow-limited inspiratory waveforms:
(i) (Classically) Flattened: Having a rise followed by a relatively flat portion, followed by a fall.
(ii) M-shaped: Having two local peaks, one at the early part, and one at the late section, and a relatively flat portion between the two peaks.
(iii) Chair-shaped: Having a single local peak, the peak being at the early part, followed by a relatively flat portion.
(iv) Reverse-chair shaped: Having a relatively flat portion followed by single local peak, the peak being at the late section.

Hypopnea: A reduction in flow, but not a cessation of flow. In one form, a hypopnea may be said to have occurred when there is a reduction in flow below a threshold rate for a duration. A central hypopnea may be said to have occurred when a hypopnea is detected that is due to a reduction in breathing effort.

Hyperpnea: An increase in flow to a level higher than normal flow rate.

Hypoventilation: Hypoventilation is said to occur when the amount of gas exchange taking place over some timescale is below the current requirements of the patient.

Hyperventilation: Hyperventilation is said to occur when the amount of gas exchange taking place over some timescale is above the current requirements of the patient.

Inspiratory portion of a breathing cycle: The period from the start of inspiratory flow to the start of expiratory flow will be taken to be the inspiratory portion of a breathing cycle.

Patency (airway): The degree of the airway being open, or the extent to which the airway is open. A patent airway is open. Airway patency may be quantified, for example with a value of one (1) being patent, and a value of zero (0), being closed (obstructed).

Positive End-Expiratory Pressure (PEEP): The pressure above atmosphere in the lungs that exists at the end of expiration.

Peak flow rate (Qpeak): The maximum value of flow rate during the inspiratory portion of the respiratory flow rate waveform.

Respiratory flow rate, airflow rate, patient airflow rate, respiratory airflow rate (Qr): These synonymous terms may be understood to refer to the RPT device's estimate of respiratory airflow rate, as opposed to "true respiratory flow" or "true respiratory airflow", which is the actual respiratory flow rate experienced by the patient, usually expressed in litres per minute.

Tidal volume (Vt): The volume of air inspired or expired per breath during normal breathing, when extra effort is not applied. This quantity may be more specifically defined as inspiratory tidal volume (Vi) or expiratory tidal volume (Ve).

Inspiratory Time (Ti): The duration of the inspiratory portion of the respiratory flow rate waveform.

Expiratory Time (Te): The duration of the expiratory portion of the respiratory flow rate waveform.

Total (breath) Time (Ttot): The total duration between the start of the inspiratory portion of one respiratory flow rate waveform and the start of the inspiratory portion of the following respiratory flow rate waveform.

Typical recent ventilation: The value of ventilation around which recent values over some predetermined timescale tend to cluster, that is, a measure of the central tendency of the recent values of ventilation.

Upper airway obstruction (UAO): includes both partial and total upper airway obstruction. This may be associated with a state of flow limitation, in which the level of flow increases only slightly or may even decrease as the pressure difference across the upper airway increases (Starling resistor behaviour).

Ventilation (Vent): A measure of the total amount of gas being exchanged by the patient's respiratory system. Measures of ventilation may include one or both of inspiratory and expiratory flow, per unit time. When expressed as a volume per minute, this quantity is often referred to as "minute ventilation". Minute ventilation is sometimes given simply as a volume, understood to be the volume per minute.

5.9.3 RPT Device Parameters

Flow rate: The instantaneous volume (or mass) of air delivered per unit time. While flow rate and ventilation have the same dimensions of volume or mass per unit time, flow rate is measured over a much shorter period of time. In some cases, a reference to flow rate will be a reference to a scalar quantity, namely a quantity having magnitude only. In other cases, a reference to flow rate will be a reference to a vector quantity, namely a quantity having both magnitude and direction. Where it is referred to as a signed quantity, a flow rate may be nominally positive for the inspiratory portion of a breathing cycle of a patient, and hence negative for the expiratory portion of the breathing cycle of a patient. Flow rate will be given the symbol Q. 'Flow rate' is sometimes shortened to simply 'flow'. Total flow rate, Qt, is the flow rate of air leaving the RPT device. Vent flow rate, Qv, is the flow rate of air leaving a vent to allow washout of expired gases. Leak flow rate, Ql, is the flow rate of leak from a patient interface system. Respiratory flow rate, Qr, is the flow rate of air that is received into the patient's respiratory system.

Leak: The word leak will be taken to be an unintended flow of air. In one example, leak may occur as the result of an incomplete seal between a mask and a patient's face. In another example leak may occur in a swivel elbow to the ambient.

Pressure: Force per unit area. Pressure may be measured in a range of units, including cmH$_2$O (centimetres of water), g-f/cm$^2$, and hectopascals (hPa). 1 cmH$_2$O is equal to 1 g-f/cm$^2$ and is approximately 0.98 hPa. In this specification, unless otherwise stated, pressure is given in units of cmH$_2$O. The pressure in the patient interface is given the symbol Pm, while the treatment pressure, which represents a target value to be achieved by the mask pressure Pm at the current instant of time, is given the symbol Pt.

5.9.4 Terms for Ventilators

Backup rate: A parameter of a ventilator that establishes the minimum breathing rate (typically in number of breaths per minute) that the ventilator will deliver to the patient, if not triggered by spontaneous respiratory effort.

Cycling: The termination of a ventilator's inspiratory phase. When a ventilator delivers a breath to a spontaneously breathing patient, at the end of the inspiratory portion of the breathing cycle, the ventilator is said to be cycled to stop delivering the breath.

Expiratory positive airway pressure (EPAP): a base pressure, to which a pressure varying within the breath is added to produce the desired mask pressure which the ventilator will attempt to achieve at a given time.

End expiratory pressure (EEP): Desired mask pressure which the ventilator will attempt to achieve at the end of the expiratory portion of the breath. If the pressure waveform template $\pi(\Phi)$ is zero-valued at the end of expiration, i.e. $\pi(\Phi)=0$ when $\Phi=1$, the EEP is equal to the EPAP.

Inspiratory positive airway pressure (IPAP): Maximum desired mask pressure which the ventilator will attempt to achieve during the inspiratory portion of the breath.

Pressure support: A number that is indicative of the increase in pressure during ventilator inspiration over that during ventilator expiration, and generally means the difference in pressure between the maximum value during inspiration and the base pressure (e.g., PS=IPAP−EPAP). In some contexts pressure support means the difference which the ventilator aims to achieve, rather than what it actually achieves.

Servo-ventilator: A ventilator that measures patient ventilation, has a target ventilation, and which adjusts the level of pressure support to bring the patient ventilation towards the target ventilation.

Spontaneous/Timed (S/T): A mode of a ventilator or other device that attempts to detect the initiation of a breath of a spontaneously breathing patient. If however, the device is unable to detect a breath within a predetermined period of time, the device will automatically initiate delivery of the breath.

Swing: Equivalent term to pressure support.

Triggering: When a ventilator delivers a breath of air to a spontaneously breathing patient, it is said to be triggered to do so at the initiation of the respiratory portion of the breathing cycle by the patient's efforts.

Ventilator: A mechanical device that provides pressure support to a patient to perform some or all of the work of breathing.

5.9.5 Anatomy of the Respiratory System

Diaphragm: A sheet of muscle that extends across the bottom of the rib cage. The diaphragm separates the thoracic cavity, containing the heart, lungs and ribs, from the abdominal cavity. As the diaphragm contracts the volume of the thoracic cavity increases and air is drawn into the lungs.

Larynx: The larynx, or voice box houses the vocal folds and connects the inferior part of the pharynx (hypopharynx) with the trachea.

Lungs: The organs of respiration in humans. The conducting zone of the lungs contains the trachea, the bronchi, the bronchioles, and the terminal bronchioles. The respiratory zone contains the respiratory bronchioles, the alveolar ducts, and the alveoli.

Nasal cavity: The nasal cavity (or nasal fossa) is a large air-filled space above and behind the nose in the middle of the face. The nasal cavity is divided in two by a vertical fin called the nasal septum. On the sides of the nasal cavity are three horizontal outgrowths called nasal conchae (singular "concha") or turbinates. To the front of the nasal cavity is the nose, while the back blends, via the choanae, into the nasopharynx.

Pharynx: The part of the throat situated immediately inferior to (below) the nasal cavity, and superior to the oesophagus and larynx. The pharynx is conventionally divided into three sections: the nasopharynx (epipharynx) (the nasal part of the pharynx), the oropharynx (mesopharynx) (the oral part of the pharynx), and the laryngopharynx (hypopharynx).

5.10 Other Remarks

A portion of the disclosure of this patent document contains material which is subject to copyright protection. The copyright owner has no objection to the facsimile reproduction by anyone of the patent document or the patent disclosure, as it appears in Patent Office patent files or records, but otherwise reserves all copyright rights whatsoever.

Unless the context clearly dictates otherwise and where a range of values is provided, it is understood that each intervening value, to the tenth of the unit of the lower limit, between the upper and lower limit of that range, and any other stated or intervening value in that stated range is encompassed within the technology. The upper and lower limits of these intervening ranges, which may be independently included in the intervening ranges, are also encompassed within the technology, subject to any specifically excluded limit in the stated range. Where the stated range includes one or both of the limits, ranges excluding either or both of those included limits are also included in the technology.

Furthermore, where a value or values are stated herein as being implemented as part of the technology, it is understood that such values may be approximated, unless otherwise stated, and such values may be utilized to any suitable significant digit to the extent that a practical technical implementation may permit or require it.

Unless defined otherwise, all technical and scientific terms used herein have the same meaning as commonly understood by one of ordinary skill in the art to which this technology belongs. Although any methods and materials similar or equivalent to those described herein can also be used in the practice or testing of the present technology, a limited number of the exemplary methods and materials are described herein.

When a particular material is identified as being used to construct a component, obvious alternative materials with similar properties may be used as a substitute. Furthermore, unless specified to the contrary, any and all components herein described are understood to be capable of being manufactured and, as such, may be manufactured together or separately.

It must be noted that as used herein and in the appended claims, the singular forms "a", "an", and "the" include their plural equivalents, unless the context clearly dictates otherwise.

All publications mentioned herein are incorporated herein by reference in their entirety to disclose and describe the methods and/or materials which are the subject of those publications. The publications discussed herein are provided solely for their disclosure prior to the filing date of the present application. Nothing herein is to be construed as an admission that the present technology is not entitled to antedate such publication by virtue of prior invention. Further, the dates of publication provided may be different from the actual publication dates, which may need to be independently confirmed.

The terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The subject headings used in the detailed description are included only for the ease of reference of the reader and should not be used to limit the subject matter found throughout the disclosure or the claims. The subject headings should not be used in construing the scope of the claims or the claim limitations.

Although the technology herein has been described with reference to particular examples, it is to be understood that these examples are merely illustrative of the principles and applications of the technology. In some instances, the terminology and symbols may imply specific details that are not required to practice the technology. For example, although the terms "first" and "second" (etc.) may be used, unless otherwise specified, they are not intended to indicate any order but may be utilised to distinguish between distinct elements. Furthermore, although process steps in the methodologies may be described or illustrated in an order, such an ordering is not required. Those skilled in the art will recognize that such ordering may be modified and/or aspects thereof may be conducted concurrently or even synchronously.

It is therefore to be understood that numerous modifications may be made to the illustrative examples and that other arrangements may be devised without departing from the spirit and scope of the technology.

5.11 REFERENCE LABEL LIST

| | |
|---|---|
| patient | 1000 |
| patient interface | 3000 |
| non - invasive patient interface | 3000 |
| seal - forming structure | 3100 |
| plenum chamber | 3200 |
| structure | 3300 |
| vent | 3400 |
| connection port | 3600 |
| forehead support | 3700 |
| RPT device | 4000 |
| external housing | 4010 |
| upper portion | 4012 |
| portion | 4014 |
| panel | 4015 |
| chassis | 4016 |
| handle | 4018 |
| pneumatic block | 4020 |
| pneumatic components | 4100 |
| air filter | 4110 |
| inlet air filter | 4112 |
| outlet air filter | 4114 |
| inlet muffler | 4122 |
| outlet muffler | 4124 |
| pressure generator | 4140 |
| controllable blower | 4142 |
| motor | 4144 |
| air circuit | 4170 |
| supplemental oxygen | 4180 |
| electrical components | 4200 |
| Printed Circuit Board Assembly | 4202 |
| electrical power supply | 4210 |
| input device | 4220 |
| central controller | 4230 |
| clock | 4232 |
| therapy device controller | 4240 |
| protection circuits | 4250 |
| memory | 4260 |
| transducers | 4270 |
| pressure sensor | 4272 |
| flow rate sensor | 4274 |
| gas temperature sensor | 4275 |
| motor speed transducer | 4276 |
| atmospheric pressure sensor | 4277 |
| ambient relative humidity sensor | 4279 |
| data communication interface | 4280 |
| remote external communication network | 4282 |
| local external communication network | 4284 |
| remote external device | 4286 |
| local external device | 4288 |
| output devices | 4290 |
| display driver | 4292 |
| display | 4294 |
| algorithms | 4300 |
| pre-processing module | 4310 |
| pressure compensation algorithm | 4312 |
| vent flow rate estimation | 4314 |
| leak flow rate estimation algorithm | 4316 |
| flow rate signal estimation | 4317 |
| respiratory flow rate estimation algorithm | 4318 |
| therapy engine module | 4320 |
| phase determination algorithm | 4321 |
| waveform determination algorithm | 4322 |
| ventilation determination algorithm | 4323 |
| inspiratory flow limitation detection | 4324 |
| apnea detection algorithm | 4325 |
| M - shape detection algorithm | 4326 |
| airway patency determination algorithm | 4327 |
| typical recent ventilation determination | 4328 |
| therapy parameter determination algorithm | 4329 |
| therapy control module | 4330 |
| humidifier | 5000 |
| humidifier inlet | 5002 |
| humidifier outlet | 5004 |
| humidifier base | 5006 |
| humidifier reservoir | 5110 |
| humidifier reservoir dock | 5130 |
| heating element | 5240 |
| humidifier controller | 5250 |
| estimation process | 7002 |
| flow rate estimate unit | 7004 |
| flow rate estimate signal | 7008 |
| input signals | 7010 |
| pressure | 7012 |
| motor speed | 7014 |
| atmospheric pressure | 7016 |
| gas temperature | 7018 |
| ambient relative humidity | 7020 |
| Motor parameter | 7021 |
| Oxygen sensor signal | 7023 |
| step or process | 8002-34 |

The invention claimed is:

1. A method of a controller for generating a signal representing an estimate of a flow rate of a flow of breathable gas associated with a respiratory therapy device, the respiratory therapy device comprising a motor-operated blower, the method comprising:
  receiving in the controller, from a pressure sensor, an electronic signal representing a measure of pressure of the breathable gas;
  receiving in the controller, from a speed sensor, an electronic signal representing a measure of speed of the motor;
  computing, in the controller, an entrained air density function;
  generating, in the controller, the signal representing the estimate of the flow rate of the breathable gas with a flow estimate function, the flow estimate function comprising a function of (a) the signal representing the measure of pressure, (b) the signal representing the measure of speed of the motor, and (c) the entrained air density function; and
  modifying, by the controller, a control parameter controlling the motor-operated blower based on the generated signal representing the estimate of the flow rate of the breathable gas.

2. The method of claim 1, wherein the entrained air density function comprises an atmospheric density value and an atmospheric density reference value.

3. The method of claim 2, wherein the entrained air density function comprises a first ratio of the atmospheric density value and the atmospheric density reference value.

4. The method of claim 3, wherein the entrained air density function comprises a second ratio of the atmospheric density value and the atmospheric density reference value.

5. The method of claim 1, wherein generating the estimate of the flow rate of breathable gas further comprises computing a motor power, wherein the generated estimate of the flow rate of breathable gas is based on the motor power.

6. The method of claim 1, wherein the entrained air density function comprises a function of an atmospheric pressure value, a temperature value and a relative humidity value.

7. The method of claim 6, further comprising evaluating a signal from an oxygen sensor for computing the entrained air density function.

8. The method of claim 6, further comprising:
  receiving in the controller, from an atmospheric pressure sensor, an electronic signal representing a measure of atmospheric pressure of the breathable gas, wherein the atmospheric pressure value is the measure of atmospheric pressure of the breathable gas;
  receiving in the controller, from a gas temperature sensor, an electronic signal representing a measure of gas temperature of the breathable gas, wherein the temperature value is the measure of gas temperature of the breathable gas; and
  receiving in the controller, from an ambient relative humidity sensor, an electronic signal representing a measure of ambient relative humidity of the breathable gas, wherein the ambient relative humidity value is the measure of ambient relative humidity of the breathable gas.

9. The method of claim 6, wherein the function of the atmospheric pressure value, the temperature value and the relative humidity value comprises a saturated vapour pressure function according to temperature.

10. The method of claim 9, wherein the saturated vapour pressure function according to temperature is defined by:

$$6.1078 * e^{17.2693882 * \left(\frac{Temp_{local_{DegC}}}{Temp_{local_{DegC}} + 237.4}\right)}$$

wherein $Temp_{local\_DegC}$ is the temperature value.

11. The method of claim 6, wherein the function of the atmospheric pressure value, the temperature value and the relative humidity value comprises a vapour pressure function according to temperature and relative humidity.

12. The method of claim 11, wherein the vapour pressure function according to temperature and relative humidity is defined by multiplying (a) a result of a saturated vapour pressure function according to temperature, and (b) the relative humidity value as follows:

$$RH_{local} * Psv(Temp_{local\_Degc})$$

wherein $RH_{local}$ is the relative humidity value, and
wherein $Psv(Temp_{local\_DegC})$ is the saturated vapour pressure function according to temperature.

13. The method according to claim 12, wherein the function of the atmospheric pressure value, the temperature value and the relative humidity value is defined by:

$$\rho_0 \cdot \left(\frac{Patm_{local} - 0.3783 * Pv(Temp_{local\_DegC}, RH_{local})}{P_0}\right) \cdot \frac{T_0}{Temp_{local\_DegK}}$$

wherein:
  $P_0 = 103$ hectoPascals;
  $T_0 = 15$ degrees Celsius or 288.15 degrees Kelvin;

$$\rho_0 = 1.2256 \ \frac{kg}{m^3};$$

$P_{atm\_local}$ is the atmospheric pressure value;
  $Pv(Temp_{local\_DegC}, RH_{local})$ is the vapour pressure function according to temperature and relative humidity; and
  $Temp_{local\_DegK}$ is the temperature value.

14. The method of claim 1, wherein the flow estimate function comprises a set of frequency functions.

15. The method of claim 14, wherein the set of frequency functions comprises a first rotational frequency function, the first rotational frequency function being a function of the measure of speed of the motor and the entrained air density function.

16. The method of claim 15, wherein the set of frequency functions comprises a second rotational frequency function, the second rotational frequency function being a function of the measure of speed of the motor.

17. The method of claim 16, wherein the set of frequency functions comprises a third rotational frequency function, the third rotational frequency function being a function of the measure of speed of the motor and the entrained air density function.

18. The method of claim 17, wherein the first rotational frequency function is defined by:

$$(C1 * RPM - C2) * \frac{\rho_{ref}}{\rho_{local}}$$

wherein:
RPM is the measure of speed of the motor;

$$\frac{\rho_{ref}}{\rho_{local}}$$

is the entrained air density function; and
C1 and C2 are empirically derived constants.

19. The method of claim 17, wherein the second rotational frequency function is defined by:

$$-C3*RPM^2-C4*RPM-C5$$

wherein:
RPM is the measure of speed of the motor; and
C3, C4 and C5 are empirically derived constants.

20. The method of claim 17, wherein the third rotational frequency function is defined by:

$$(C6*RPM^2 - C7*RPM + C8) * \frac{\rho_{local}}{\rho_{ref}}$$

wherein:
RPM is the measure of speed of the motor;

$$\frac{\rho_{ref}}{\rho_{local}}$$

is the entrained air density function; and
C6, C7 and C8 are empirically derived constants.

21. The method of claim 20, wherein the flow estimate function is defined by:

$$\frac{-B - \sqrt{B^2 - 4A(C - Pres\_meas)}}{2A}$$

where:
A is the first rotational frequency function;
B is the second rotational frequency function;
C is the third rotational frequency function; and
Pres_meas is the measure of pressure of the breathable gas from the pressure sensor.

22. The method of claim 1, further comprising:
receiving in the controller, from a flow rate sensor, an electronic signal representing a measure of flow rate of the breathable gas;
comparing, in the controller, the electronic signal representing the measure of flow rate of the breathable gas and the generated signal representing the estimate of the flow rate of the breathable gas; and
generating, by the controller, an output indicator representing an assessment of accuracy of the flow rate sensor based on the comparing.

23. The method of claim 22, further comprising, by the controller, modifying a control parameter for operating the motor-operated blower based on the output indicator.

24. The method of claim 23, wherein the control parameter is any one of a pressure set point and a flow rate set point.

25. A non-transitory processor-readable medium, having stored thereon processor-executable instructions which, when executed by a processor of a controller of motor-operated blower in a respiratory therapy device, cause the processor to generate an estimate of a flow rate of a breathable gas associated with the respiratory therapy device, the processor-executable instructions comprising instructions to control operations according to the method of claim 1.

26. A respiratory therapy device comprising:
a motor-operated blower adapted to couple with a patient respiratory interface and adapted to produce a respiratory therapy comprising a flow of breathable gas via the patient respiratory interface,
a pressure sensor configured to generate an electronic signal representing a measure of pressure of the breathable gas;
a speed sensor configured to generate an electronic signal representing a measure of speed of the motor; and
a controller comprising one or more processors and coupled with the motor-operated blower, the pressure sensor and the speed sensor, the controller configured to:
receive the electronic signal representing a measure of pressure of the breathable gas;
receive the electronic signal representing a measure of speed of the motor;
compute an entrained air density function;
generate a signal representing an estimate of a flow rate of the breathable gas with a flow estimate function, the flow estimate function comprising a function of (a) the signal representing the measure of pressure, (b) the signal representing the measure of speed of the motor, and (c) the entrained air density function; and
modify a control parameter that controls the motor-operated blower based on the generated signal representing the estimate of the flow rate of the breathable gas.

27. The respiratory therapy device of claim 26, wherein the entrained air density function comprises an atmospheric density value and an atmospheric density reference value.

28. The respiratory therapy device of claim 27, wherein the entrained air density function comprises a first ratio of the atmospheric density value and the atmospheric density reference value.

29. The respiratory therapy device of claim 28, wherein the entrained air density function comprises a second ratio of the atmospheric density value and the atmospheric density reference value.

30. The respiratory therapy device of claim 26, wherein to generate the estimate of the flow rate of breathable gas, the controller is further configured to compute a motor power, wherein the generated estimate of the flow rate of breathable gas is based on the motor power.

31. The respiratory therapy device of claim 26, wherein the entrained air density function comprises a function of an atmospheric pressure value, a temperature value and a relative humidity value.

32. The respiratory therapy device of claim 31, wherein the controller is further configured to evaluate a signal from an oxygen sensor for computing the entrained air density function.

33. The respiratory therapy device of claim 31, further comprising:
an atmospheric pressure sensor configured to generate an electronic signal representing a measure of atmospheric pressure of the breathable gas, wherein the atmospheric pressure value is the measure of atmospheric pressure of the breathable gas;
a gas temperature sensor configured to generate an electronic signal representing a measure of gas temperature of the breathable gas, wherein the temperature value is the measure of gas temperature of the breathable gas; and an ambient relative humidity sensor, an electronic signal representing a measure of ambient relative humidity of the breathable gas, wherein the relative humidity value is the measure of ambient relative humidity of the breathable gas;

wherein the controller is configured to receive:
- the electronic signal representing the measure of atmospheric pressure;
- the electronic signal representing the measure of gas temperature; and
- the electronic signal representing the measure of ambient relative humidity.

34. The respiratory therapy device of claim 31, wherein the function of the atmospheric pressure value, the temperature value and the relative humidity value comprises a saturated vapour pressure function according to temperature.

35. The respiratory therapy device of claim 31, wherein the function of the atmospheric pressure value, the temperature value and the relative humidity value comprises a vapour pressure function according to temperature and relative humidity.

36. The respiratory therapy device of claim 26, wherein the flow estimate function comprises a set of frequency functions.

37. The respiratory therapy device of claim 36, wherein the set of frequency functions comprises a first rotational frequency function, the first rotational frequency function being a function of the measure of speed of the motor and the entrained air density function.

38. The respiratory therapy device of claim 37, wherein the set of frequency functions comprises a second rotational frequency function, the second rotational frequency function being a function of the measure of speed of the motor.

39. The respiratory therapy device of claim 38, wherein the set of frequency functions comprises a third rotational frequency function, the third rotational frequency function being a function of the measure of speed of the motor and the entrained air density function.

40. The respiratory therapy device of claim 26, further comprising:
- a flow rate sensor configured to generate an electronic signal representing a measure of flow rate of the breathable gas;

wherein the controller is further configured to:
- receive the electronic signal representing the measure of flow rate of the breathable gas;
- compare the electronic signal representing the measure of flow rate of the breathable gas and the generated signal representing the estimate of the flow rate of the breathable gas; and
- generate an output indicator representing an assessment of accuracy of the flow rate sensor based on the comparing.

41. The respiratory therapy device of claim 40, wherein the controller is further configured to modify a control parameter for operating the motor-operated blower based on the output indicator.

42. The respiratory therapy device of claim 41, wherein the control parameter is any one of a pressure set point and a flow rate set point.

* * * * *